United States Patent
Matono et al.

(10) Patent No.: US 7,382,578 B2
(45) Date of Patent: Jun. 3, 2008

(54) THIN FILM MAGNETIC HEAD, METHOD OF MANUFACTURING THE SAME AND MAGNETIC RECORDING APPARATUS

(75) Inventors: Naoto Matono, Saku (JP); Yasuyuki Notsuke, Tokyo (JP)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 655 days.

(21) Appl. No.: 11/062,497

(22) Filed: Feb. 23, 2005

(65) Prior Publication Data

US 2005/0219750 A1    Oct. 6, 2005

(30) Foreign Application Priority Data

Mar. 30, 2004    (JP)    ............................. 2004-098231

(51) Int. Cl.
*G11B 5/147*    (2006.01)
(52) U.S. Cl. .................................................... 360/126
(58) Field of Classification Search ................. 360/126
See application file for complete search history.

(56) References Cited

U.S. PATENT DOCUMENTS

| | | | |
|---|---|---|---|
| 6,775,099 B2 | 8/2004 | Kuroda et al. | |
| 2002/0078553 A1 | 6/2002 | Sato | |
| 2002/0080525 A1 | 6/2002 | Sato et al. | |

FOREIGN PATENT DOCUMENTS

| | | |
|---|---|---|
| JP | A-2002-197609 | 7/2002 |
| JP | A-2002-197611 | 7/2002 |
| JP | A-2002-197613 | 7/2002 |
| JP | A-2002-197615 | 7/2002 |
| JP | A-2003-036503 | 2/2003 |
| JP | A-2003-203311 | 7/2003 |

*Primary Examiner*—A. J. Heinz
*Assistant Examiner*—Mark Blouin
(74) *Attorney, Agent, or Firm*—Oliff & Berridge, PLC

(57) ABSTRACT

Provided is a method of manufacturing a thin film magnetic head capable of manufacturing a thin film magnetic head with as high performance as possible. A magnetic pole layer is formed so as to have a laminate structure in which an auxiliary magnetic pole layer (including an adjacent portion and a nonadjacent portion) extending from a first flare point to the rear and a main magnetic pole layer (including a front end portion and a rear end portion) extending from an air bearing surface to the rear through the first flare point are laminated in this order. As (1) a recording track width is controlled with high precision through forming the main magnetic pole layer with high precision, (2) recording is stably performed by an increase in the amount of magnetic flux contained in the main magnetic pole layer, and (3) information recorded on a recording medium is stably maintained through preventing information erasing without intention, the thin film magnetic head can achieve higher performance.

16 Claims, 19 Drawing Sheets

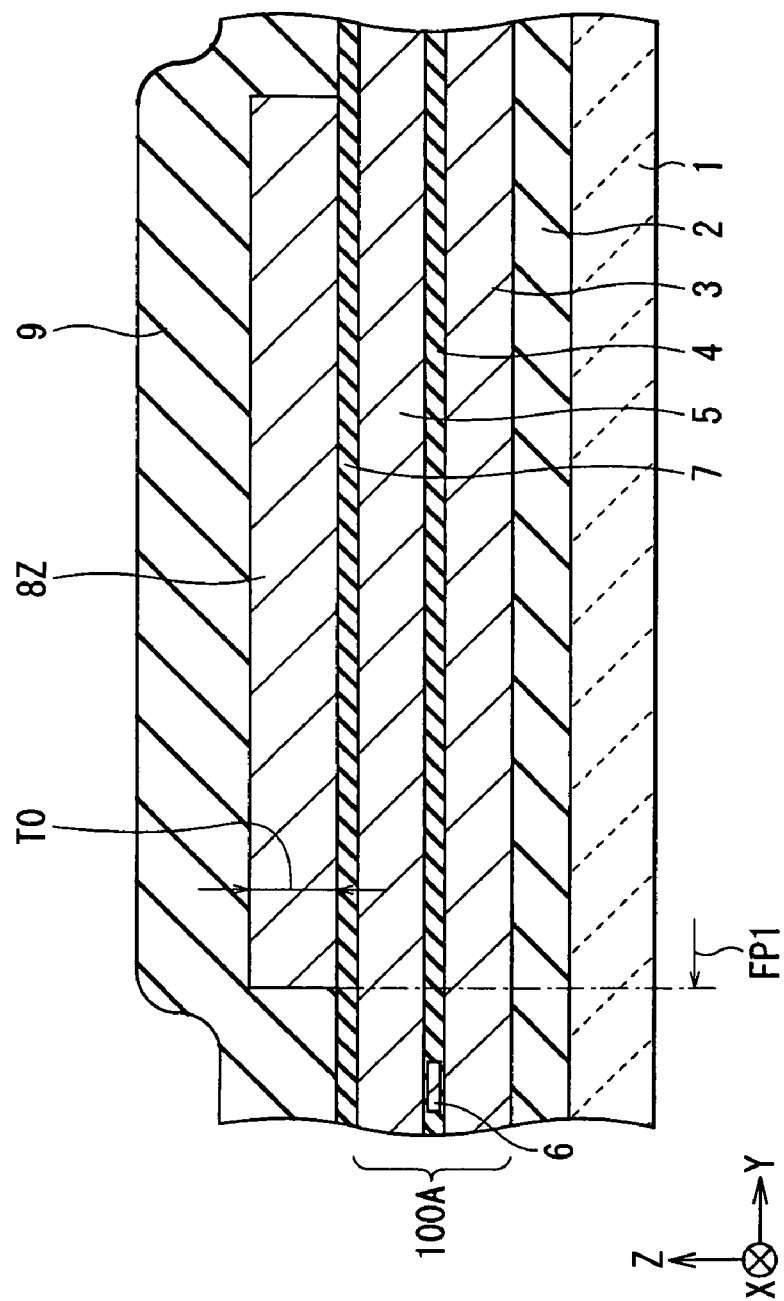
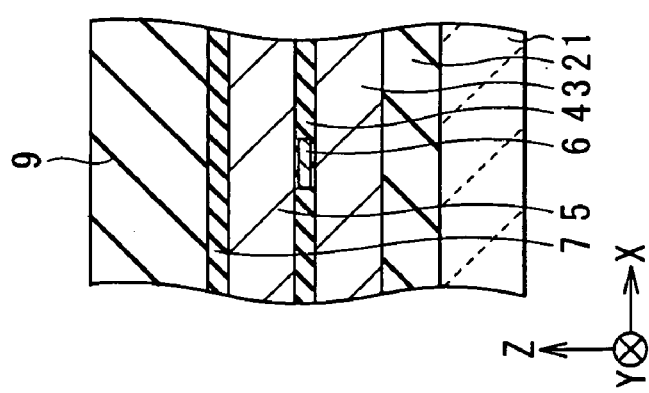
FIG. 7A
FIG. 7B

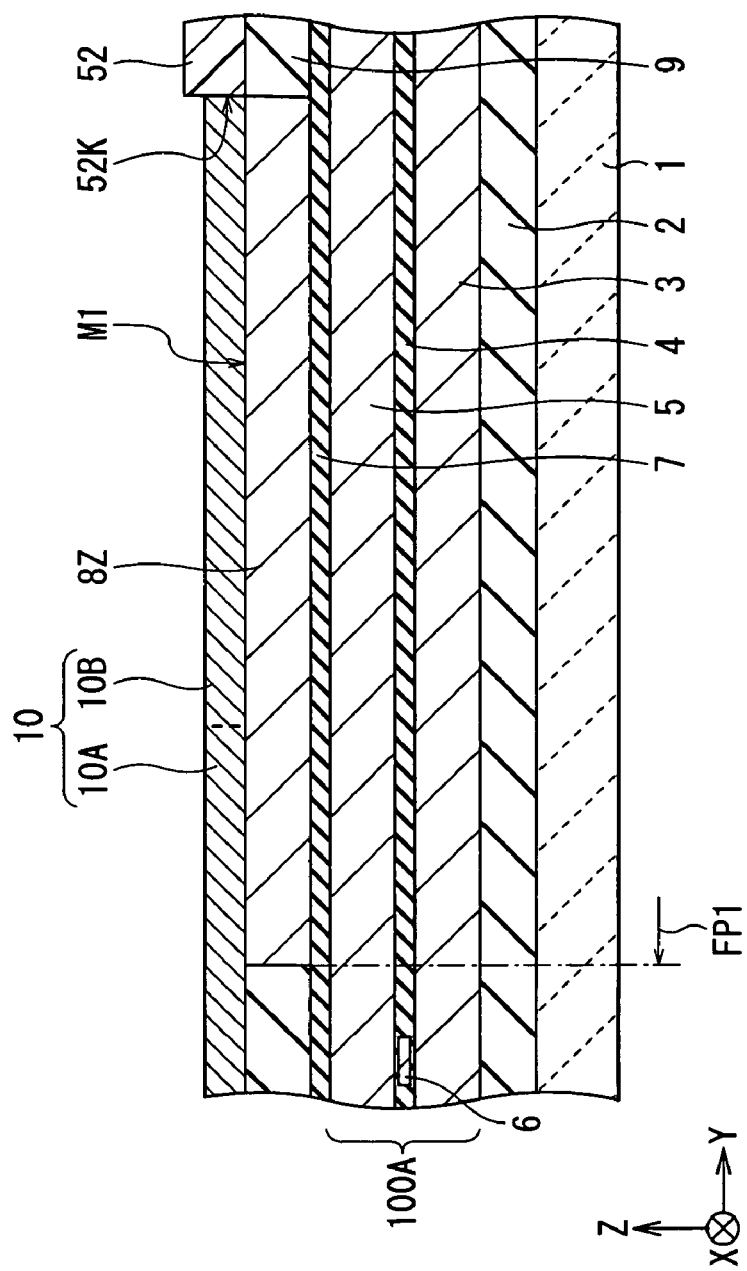
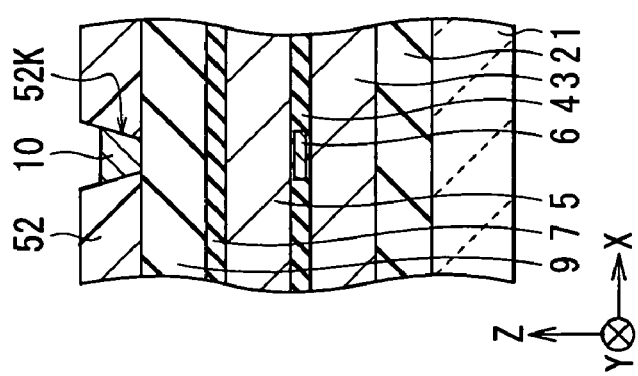
FIG. 9B
FIG. 9A

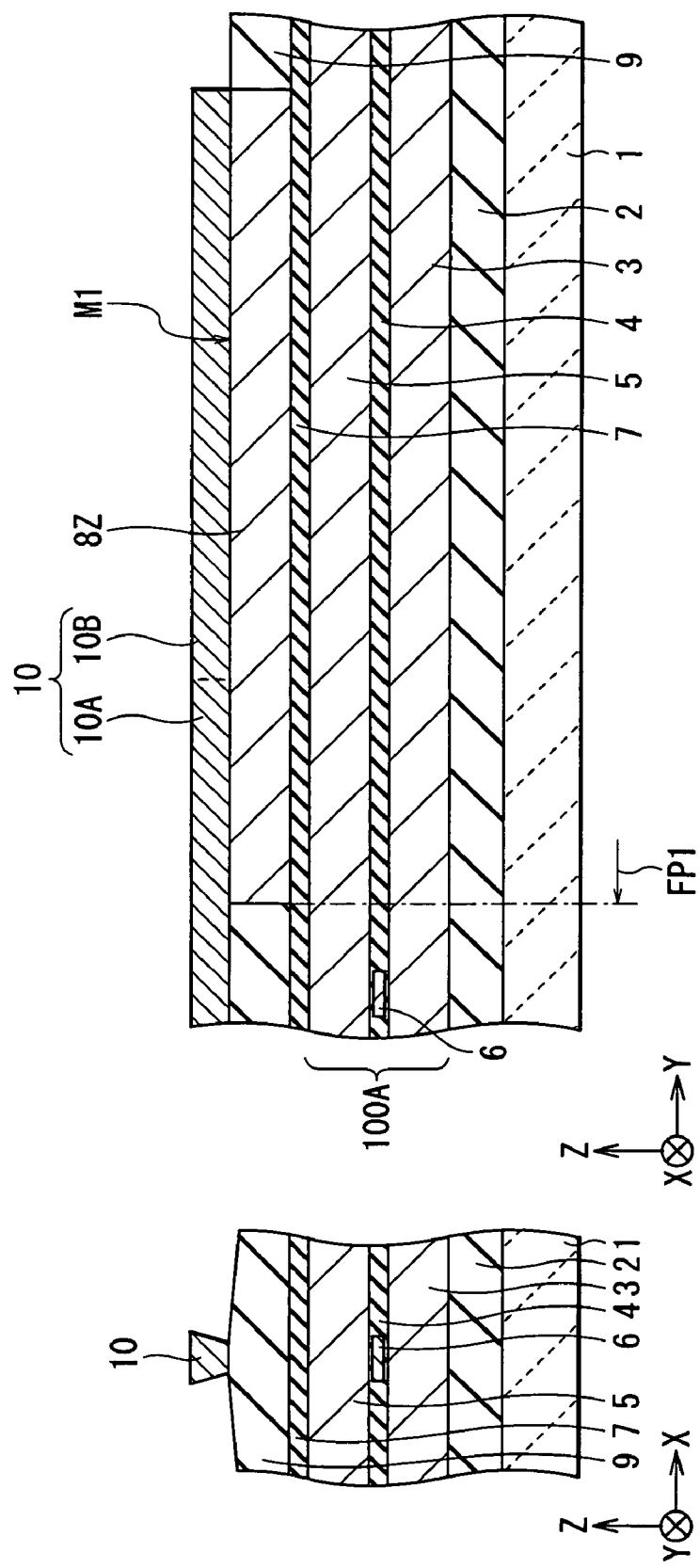

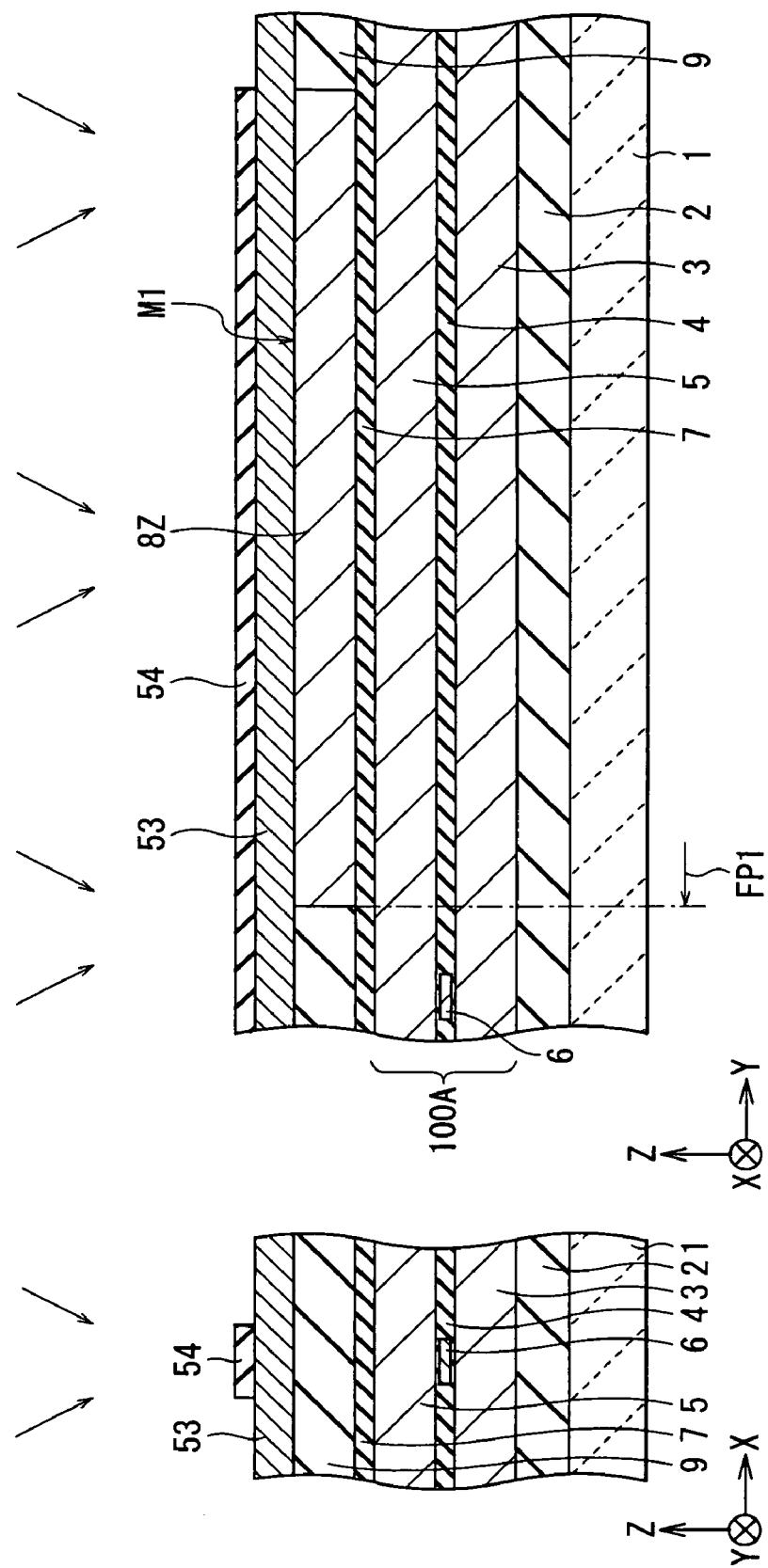

THIN FILM MAGNETIC HEAD, METHOD OF MANUFACTURING THE SAME AND MAGNETIC RECORDING APPARATUS

BACKGROUND OF THE INVENTION

1. Field of the Invention

The present invention relates to a thin film magnetic head comprising at least an inductive magnetic transducer for recording, a method of manufacturing the thin film magnetic head, and a magnetic recording apparatus comprising the thin film magnetic head.

2. Description of the Related Art

In recent years, an improvement in performance of a thin film magnetic head which is mounted in a magnetic recording apparatus (for example, a hard disk drive) has been sought in accordance with an increase in the areal density of a magnetic recording medium (such as a hard disk; hereinafter simply referred to as "recording medium"). As recording systems of the thin film magnetic head, for example, a longitudinal recording system in which a signal magnetic field is oriented in an in-plane direction (a longitudinal direction) of a recoding medium and a perpendicular recording system in which a signal magnetic field is oriented in a direction perpendicular to a surface of the recording medium are well known. At present, the longitudinal recording system is widely used, but in consideration of market forces in accordance with an improvement in areal density, it is assumed that the perpendicular recording system instead of the longitudinal recording system holds promise for the future, because the perpendicular recording system can obtain advantages that higher linear recording density can be achieved and that a hard disk on which information has been already recorded has resistance to thermal decay effects.

The perpendicular recording system thin film magnetic head comprises a thin film coil generating a magnetic flux, and a magnetic pole layer emitting the magnetic flux generated in the thin film coil to a recording medium to perform recording. In general, the magnetic pole layer extends from a recording-medium-facing surface (an air bearing surface) which faces the recording medium to the rear, and has a planar shape which includes a uniform width region with a uniform width determining a recording track width of the recording medium and a widening region with a width larger than that of the uniform width region. A position where the width of the magnetic pole layer expands from the uniform width region to the widening region is called "flare point". In the thin film magnetic head of this kind, when a current flows through the thin film coil, a magnetic flux for recording is generated in the thin film coil. Then, when the magnetic flux is emitted from the magnetic pole layer to the recording medium, the recording medium is magnetized by a magnetic field (a perpendicular magnetic field) for recording generated by the magnetic flux, thereby information is magnetically recorded on the recording medium.

As the structure of the perpendicular recording system thin film magnetic head, some modes have been proposed.

More specifically, for example, a thin film magnetic head in which a facing surface facing a recording medium in a magnetic pole layer has a substantially trapezoidal shape to prevent the effect of side fringing due to a skew is known (for example, refer to Japanese Unexamined Patent Application Publication No. 2002-197613). In the thin film magnetic head, a magnetic pole layer includes two magnetic structures which are separately formed, that is, a main magnetic pole layer which determines a uniform width region and a yoke layer which determines a widening region, and in particular, a rear portion of the main magnetic pole layer is partially covered with the yoke layer.

Moreover, for example, a thin film magnetic head in which a main magnetic pole layer is formed through growing a plating film on a yoke layer, and a front end surface of the yoke layer is inclined or curved to effectively flow a magnetic flux from the yoke layer to the main magnetic pole layer is known (for example, refer to Japanese Unexamined Patent Application Publication No. 2002-197611). In the thin film magnetic head, like the above-described thin film magnetic head, a magnetic pole layer includes the main magnetic pole layer and the yoke layer which are separately formed, and in particular, the main magnetic pole layer is partially overlapped on the yoke layer.

Further, for example, a thin film magnetic head in which a non-magnetic layer is disposed on a main magnetic pole layer to control the thickness and the width of the main magnetic pole layer is known (for example, refer to Japanese Unexamined Patent Application Publication No. 2002-197609). In the thin film magnetic head, like the above-described thin film magnetic head, a magnetic pole layer includes the main magnetic pole layer and a yoke layer which are separately formed, and in particular, the main magnetic pole layer is partially overlapped on the yoke layer.

Further, for example, a thin film magnetic head in which a magnetic pole layer is formed so that the cross sectional area of the magnetic pole layer is gradually reduced toward an air bearing surface, and a front end portion (pole tip) of the magnetic pole layer is disposed closer to a leading side than a plane including a trailing edge of the pole tip in order to improve a magnetic field gradient is known (for example, refer to Japanese Unexamined Patent Application Publication No. 2003-036503). In the thin film magnetic head, the magnetic pole layer is formed so as to include a main pole and the pole tip which are separately formed, and in particular, the pole tip is partially laid on the main pole.

In order to improve reliability of the perpendicular recording system thin film magnetic head and put the thin film magnetic head into widespread use, for example, it is important to establish a manufacturing technique which enables to manufacture a thin film magnetic head with as high performance as possible.

More specifically, firstly, for example, in order to control the recording track width of a recording medium with high precision on the basis of the magnetic pole layer which performs recording, it is required to form the magnetic pole layer as precisely as possible. In this case, in particular, it is important to form a portion corresponding to the uniform width region which substantially determines the recording track width with high precision.

Secondly, for example, in order to stably perform recording in the magnetic pole layer, it is required to increase the amount of the magnetic flux contained in the magnetic pole layer as much as possible. In this case, it is important to sufficiently and smoothly flow the magnetic flux from a portion corresponding to the widening region which contains the magnetic flux to a portion corresponding to the uniform width region which emits the magnetic flux in the magnetic pole layer.

Thirdly, for example, in order to stably maintain information recorded on the recording medium, it is required to prevent the recorded information from being erased without intention due to the magnetic flux contained in the magnetic pole layer to the utmost. In this case, in particular, it is important to reduce the amount of the magnetic flux emitted from a portion of the magnetic pole layer corresponding to the widening region which normally does not emit the magnetic flux without intention.

Although a promising technique of manufacturing a thin film magnetic head on the above-described three points has been in demand, conventional techniques of manufacturing a thin film magnetic head do not sufficiently meet requirements on the three points, so techniques of manufacturing a thin film magnetic head are still susceptible to improvement. Specifically, in consideration of today's technical background in which the areal density of the recording medium is increased at an accelerating rate, it is urgently required to establish a technique of manufacturing a thin film magnetic head which can obtain sufficient advantages on the above-described three points.

SUMMARY OF THE INVENTION

In view of the foregoing, it is a first object of the invention to provide a method of manufacturing a thin film magnetic head which enables to manufacture a thin film magnetic head with as high performance as possible.

It is a second object of the invention to provide a thin film magnetic head capable of achieving as high performance as possible.

It is a third object of the invention to provide a magnetic recording apparatus which comprises the thin film magnetic head of the invention and can achieve as high performance as possible.

A thin film magnetic head according to the invention comprises: a thin film coil generating a magnetic flux; and a magnetic pole layer extending from a recording-medium-facing surface facing a recording medium moving to a medium travel direction to the rear, emitting the magnetic flux generated in the thin film coil to the recording medium, and having a planar shape which includes a uniform width region determining the recording track width of the recording medium and having a uniform width and a widening region having a width larger than that of the uniform width region, wherein the magnetic pole layer has a laminate structure in which an auxiliary magnetic pole layer extending from a first widening position where the width of the magnetic pole layer expands from the uniform width region to the widening region to the rear, and determining a planar shape of the widening region, and a main magnetic pole layer extending from the recording-medium-facing surface to the rear on the medium travel direction of the auxiliary magnetic pole layer, including a first magnetic pole layer portion extending from the recording-medium-facing surface to the rear through the first widening position and a second magnetic pole layer portion having a width larger than that of the first magnetic pole layer portion in order from the recording-medium-facing surface, and determining a planar shape of the uniform width region are laminated in this order.

The thin film magnetic head according to the invention is manufactured through a method of manufacturing a thin film magnetic head according to the invention, so the thin film magnetic head can achieve higher performance.

In the method of manufacturing a thin film magnetic head according to the invention, the thin film magnetic head comprises a thin film coil generating a magnetic flux; and a magnetic pole layer extending from a recording-medium-facing surface facing a recording medium moving to a medium travel direction to the rear, emitting the magnetic flux generated in the thin film coil to the recording medium, and having a planar shape which includes a uniform width region determining the recording track width of the recording medium and having a uniform width and a widening region having a width larger than that of the uniform width region, and a step of forming the magnetic pole layer comprises: a first step of pattern-forming an auxiliary magnetic pole layer determining a planar shape of the widening region so as to extend from a first widening position where the width of the magnetic pole layer expands from the uniform width region to the widening region to the rear; and a second step of pattern-forming a main magnetic pole layer determining a planar shape of the uniform width region so as to extend from the recording-medium-facing surface to the rear on the medium travel direction of the auxiliary magnetic pole layer and include a first magnetic pole layer portion extending from the recording-medium-facing surface to the rear through the first widening position and a second magnetic pole layer portion having a width larger than that of the first magnetic pole layer portion in order from the recording-medium-facing surface, thereby forming the magnetic pole layer so as to have a laminate structure in which the auxiliary magnetic pole layer and the main magnetic pole layer are laminated in this order.

In the method of manufacturing a thin film magnetic head according to the invention, the magnetic pole layer is formed so as to have a laminate structure in which the auxiliary magnetic pole layer which extends from the first widening position to the rear and determines the planar shape of the widening region, and the main magnetic pole layer which extends from the recording-medium-facing surface to the rear through the first widening position on the medium travel direction of the auxiliary magnetic pole layer and determines the planar shape of the uniform width region are laminated in this order, and in particular, the main magnetic pole layer is formed so as to include the first magnetic pole layer portion extending from the recording-medium-facing surface to the rear through the first widening position and the second magnetic pole layer portion having a width larger than the first magnetic pole layer portion in order from the recording-medium-facing surface. Thereby, sufficient advantages, that is, high-precision control of the recording track width by high-precision formation of the main magnetic pole layer, stable recording by an increase in the amount of magnetic flux contained in the main magnetic pole layer, and stable information maintenance by prevention of information erasing without intention can be obtained.

A magnetic recording apparatus according to the invention comprises a recording medium moving in a medium travel direction; and a thin film magnetic head performing magnetic processing on the recording medium, wherein the thin film magnetic head comprises: a thin film coil generating a magnetic flux; and a magnetic pole layer extending from a recording-medium-facing surface facing a recording medium moving to a medium travel direction to the rear, emitting the magnetic flux generated in the thin film coil to the recording medium, and having a planar shape which includes a uniform width region determining the recording track width of the recording medium and having a uniform width and a widening region having a width larger than that of the uniform width region, and the magnetic pole layer has a laminate structure in which an auxiliary magnetic pole layer extending from a first widening position where the width of the magnetic pole layer expands from the uniform width region to the widening region to the rear, and determining a planar shape of the widening region, and a main magnetic pole layer extending from the recording-medium-facing surface to the rear on the medium travel direction of the auxiliary magnetic pole layer, including a first magnetic pole layer portion extending from the recording-medium-facing surface to the rear through the first widening position and a second magnetic pole layer portion having a width larger than that of the first magnetic pole layer portion in order from the recording-medium-facing surface, and determining a planar shape of the uniform width region are laminated in this order.

The magnetic recording apparatus according to the invention comprises the thin film magnetic head according to the invention, so the magnetic recording apparatus can achieve higher performance.

In the method of manufacturing a thin film magnetic head, the main magnetic pole layer may be formed through growing a plating film, or through forming a magnetic material layer, and then etching and patterning the magnetic material layer.

In the thin film magnetic head and the method of manufacturing a thin film magnetic head according to the invention, an insulating layer is formed so that the auxiliary magnetic pole layer and its surroundings are covered with the insulating layer, and then, after the auxiliary magnetic pole layer and the insulating layer are polished to form a flat surface including an end surface of the auxiliary magnetic pole layer on the medium travel direction and an end surface of the insulating layer on the medium travel direction, the main magnetic pole layer is preferably formed on the flat surface. Moreover, a relationship of 0.40<FH/(FH+NH) <0.84 is preferably established between a distance FH (μm) between the first widening position and a second widening position where the width of the main magnetic pole layer expands from the first magnetic pole layer portion to the second magnetic pole layer portion and a distance NH (μm) between the recording-medium-facing surface and the first widening position, and in particular, the distance FH (μm) is preferably within a range of larger than 0.1 μm and smaller than 0.8 μm. In this case, the auxiliary magnetic pole layer is preferably formed so as to include a third magnetic pole layer portion being disposed adjacent to the main magnetic pole layer and having a first thickness and a fourth magnetic pole layer portion being disposed nonadjacent to the main magnetic pole layer and having a second thickness smaller than the first thickness, and more specifically, the auxiliary magnetic pole layer can be formed through pattern-forming a precursor magnetic pole layer for forming the auxiliary magnetic pole layer so as to have the first thickness as a whole, forming the main magnetic pole layer on the precursor magnetic pole layer, and selectively etching and removing the precursor magnetic pole layer through the use of the main magnetic pole layer as a mask. In particular, the magnetic pole layer may be formed so as to emit a magnetic flux for magnetizing the recording medium in a direction perpendicular to a surface thereof.

The thin film magnetic head according to the invention is manufactured through the method of manufacturing a thin film magnetic head according to the invention, so the thin film magnetic head can have as high performance as possible.

In the method of manufacturing a thin film magnetic head according to the invention, the magnetic pole layer is formed so as to include the auxiliary magnetic pole layer which extends from the first widening position to the rear and determines the planar shape of the widening region and the main magnetic pole layer which extends from the recording-medium-facing surface to the rear through the first widening position on the medium travel direction of the auxiliary magnetic pole layer, and determines the planar shape of the uniform width region, and in particular, the main magnetic pole layer is formed so as to include the first magnetic pole layer portion extending from the recording-medium-facing surface to the rear through the first widening position and the second magnetic pole layer portion having a width larger than that of the first magnetic pole layer portion in order from the recording-medium-facing surface, so sufficient advantages, that is, high-precision control of the recording track width by high-precision formation of the main magnetic pole layer, stable recording by an increase in the amount of magnetic flux contained in the main magnetic pole layer, and stable information maintenance by prevention of information erasing without intention can be obtained. Therefore, the thin film magnetic head with as high performance as possible can be manufactured.

The magnetic recording apparatus according to the invention comprises the thin film magnetic head according to the invention, so the magnetic recording apparatus can achieve as high performance as possible.

Other and further objects, features and advantages of the invention will appear more fully from the following description.

BRIEF DESCRIPTION OF THE DRAWINGS

FIGS. 7A and 7B are sectional views for describing a step following the step of FIGS. 6A and 6B;

FIGS. 9A and 9B are sectional views for describing a step following the step of FIGS. 8A and 8B;

FIGS. 10A and 10B are sectional views for describing a step following the step of FIGS. 9A and 9B;

FIGS. 17A and 17B are sectional views for describing one step in a modification of the method of manufacturing the thin film magnetic head according to the embodiment of the invention;

DETAILED DESCRIPTION OF THE PREFERRED EMBODIMENTS

A preferred embodiment of the invention will be described in more detail below referring to the accompanying drawings.

Figure 1:
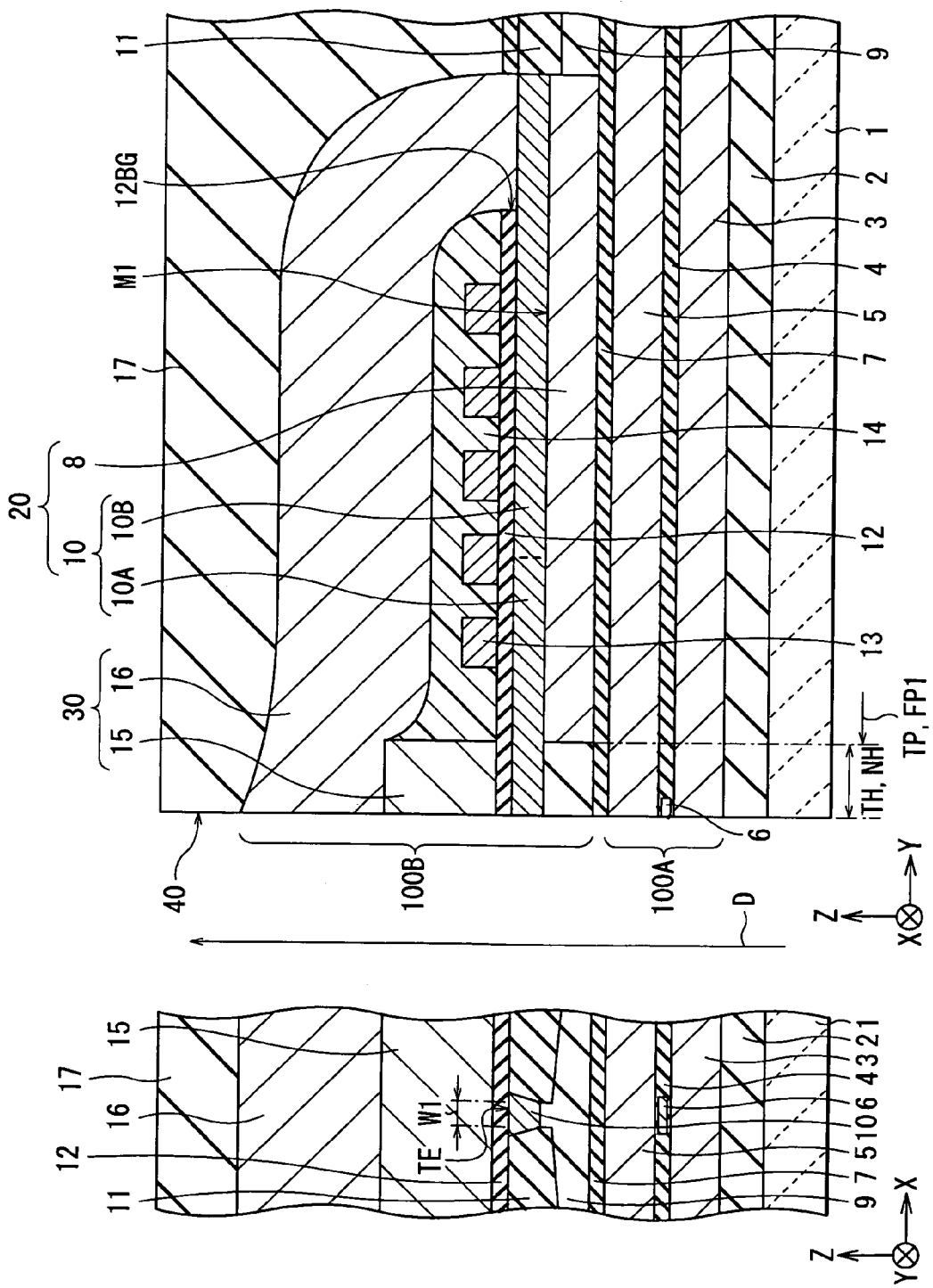
FIGS. 1A and 1B are sectional views of a thin film magnetic head according to an embodiment of the invention.
Figure 2:
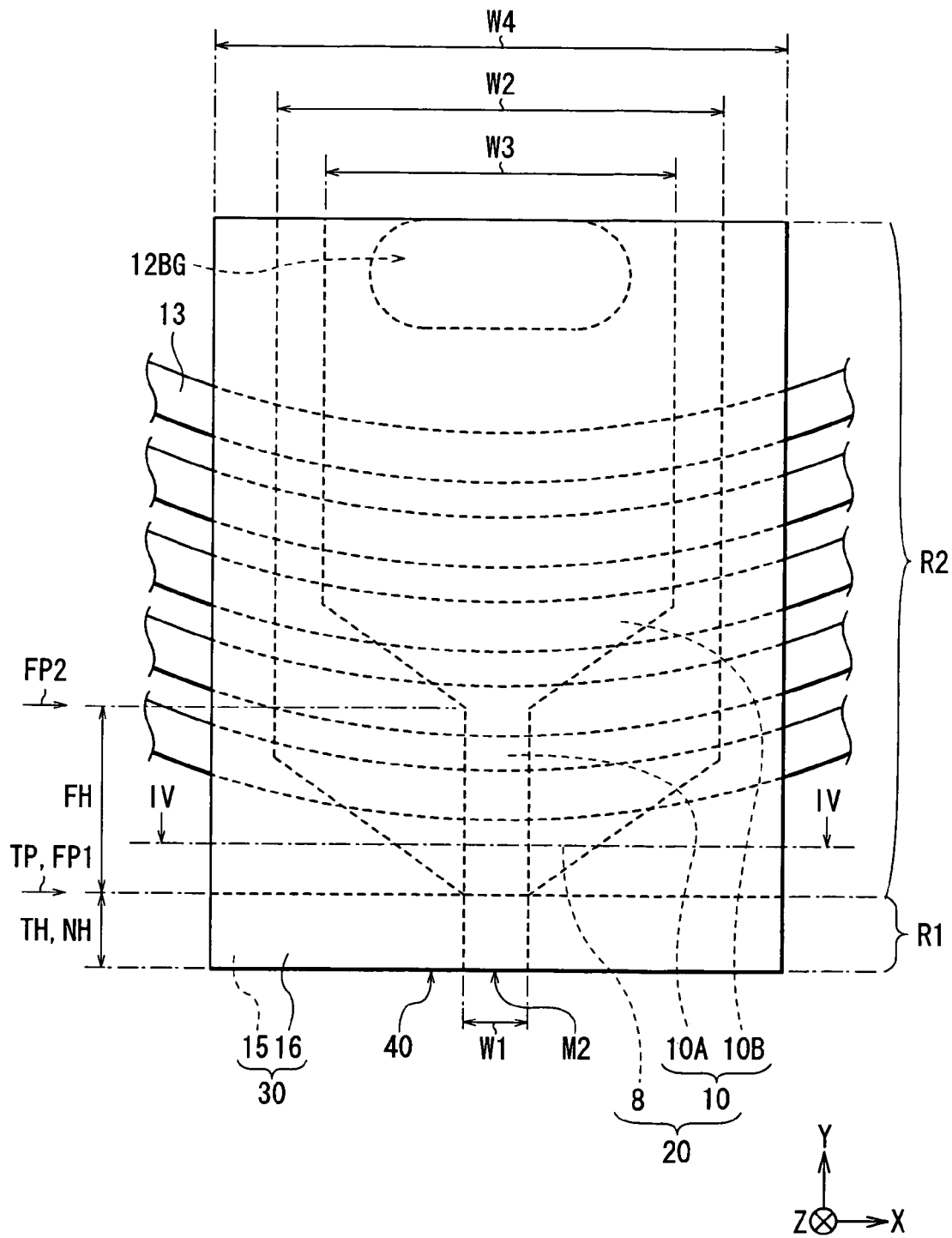
FIG. 2 is a plan view of a main part of the thin film magnetic head shown in FIGS. 1A and 1B.
Figure 3:
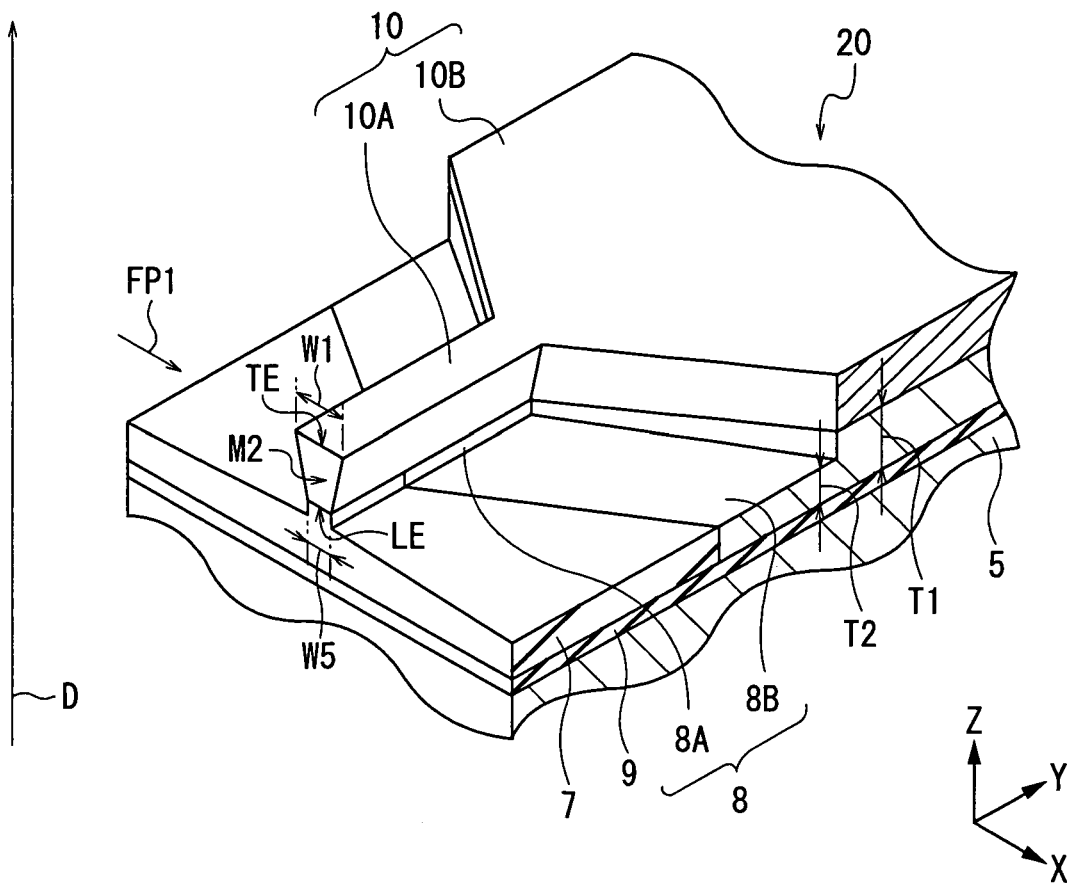
FIG. 3 is a perspective view of a main part of the thin film magnetic head shown in FIGS. 1A and 1B.
Figure 4:
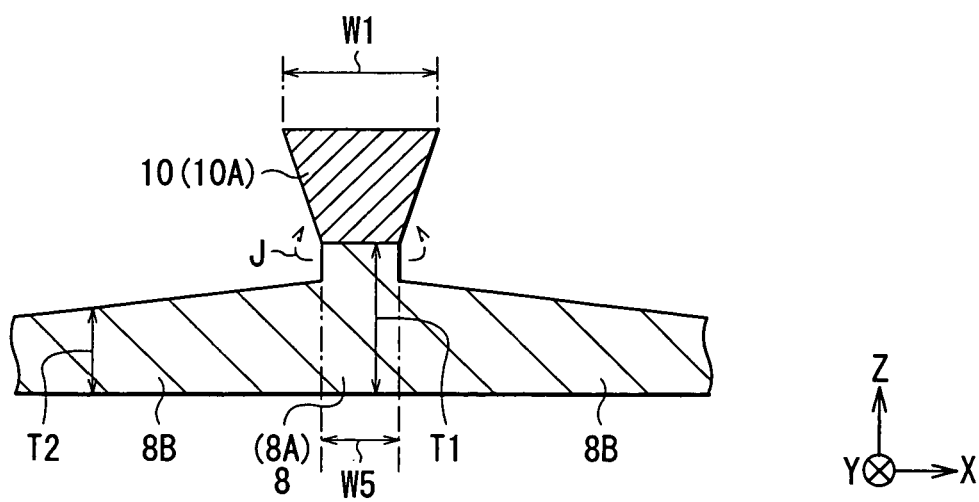
FIG. 4 is an enlarged sectional view of a main part of the thin film magnetic head shown in FIGS. 1A and 1B.

At first, referring to FIGS. 1A and 1B through 4, the structure of a thin film magnetic head according to an embodiment of the invention will be described below. FIGS. 1A and 1B through 4 show the structure of the thin film magnetic head. FIGS. 1A and 1B show sectional views of the thin film magnetic head; FIG. 2 shows a plan view of a main part of the thin film magnetic head; FIG. 3 shows a perspective view of a main part of the thin film magnetic head; and FIG. 4 shows an enlarged sectional view of a main part of the thin film magnetic head. FIG. 1A shows a sectional view parallel to an air bearing surface (along a X-Z plane) and FIG. 1B shows a sectional view perpendicular to the air bearing surface (along a Y-Z plane). FIG. 4 shows a sectional view taken along a line IV-IV of FIG. 2. An up arrow D shown in FIGS. 1A, 1B and 3 indicates a direction where a magnetic recording medium (not shown) relatively moves with respect to the thin film magnetic head (medium travel direction).

In the following description, a dimension in an X-axis direction, a dimension in a Y-axis direction and a dimension in a Z-axis direction in FIGS. 1A and 1B through 4 are expressed as "width", "length" and "thickness", respectively. Further, a side closer to the air bearing surface in the Y-axis direction is expressed as "front", and the opposite side is expressed as "rear". The same expressions are used in FIG. 5 and later drawings.

The thin film magnetic head is mounted in a magnetic recording apparatus such as, for example, a hard disk drive to perform magnetic processing on a magnetic recording medium (hereinafter simply referred to as "recording medium") such as, for example, a hard disk which moves in a medium travel direction D. More specifically, the thin film magnetic head is a composite head capable of performing recording and reproducing. As shown in FIGS. 1A and 1B, the thin film magnetic head has a structure in which an insulating layer 2 made of, for example, a non-magnetic insulating material such as aluminum oxide ($Al_2O_3$; hereinafter simply referred to as "alumina"), a reproducing head portion 100A which performs reproducing through the use of a magnetoresistive effect (MR), a separating layer 7 made of, for example, a non-magnetic insulating material such as alumina, a shield type recording head portion 100B which performs recording by a perpendicular recording system, and an overcoat layer 17 made of, for example, a non-magnetic insulating material such as alumina are laminated in this order on a substrate 1 made of, for example, a ceramic material such as AlTiC ($Al_2O_3 \cdot TiC$).

The reproducing head portion 100A has, for example, a laminate structure in which a bottom read shield layer 3, a shield gap film 4 and a top read shield layer 5 are laminated in this order. An MR device 6 as a reproducing device is buried in the shield gap film 4 so that an end surface of the MR device 6 is exposed to a recording-medium-facing surface (air bearing surface) 40 facing the recording medium.

The bottom read shield layer 3 and the top read shield layer 5 are provided to magnetically separate the MR device 6 from its surroundings, and they extend from the air bearing surface 40 toward the rear. The bottom read shield layer 3 and the top read shield layer 5 are made of, for example, a magnetic material such as a nickel-iron alloy (NiFe (for example, Ni: 80 wt %, Fe: 20 wt %); hereinafter simply referred to as "Permalloy (trade name)") with a thickness of approximately 1.0 μm to 2.0 μm.

The shield gap film 4 is provided to electrically separate the MR device 6 from its surroundings, and is made of, for example, a non-magnetic insulating material such as alumina.

The MR device 6 is provided to perform magnetic processing (reproducing) through the use of, for example, a giant magnetoresistive effect (GMR), a tunneling magnetoresistive effect (TMR) or the like.

The recording head portion 100B has, for example, a laminate structure in which a magnetic pole layer 20 which is buried in insulating layers 9 and 11, a gap layer 12 having an aperture (back gap 12BG) for magnetic connection, a thin film coil 13 buried in an insulating layer 14 and a write shield layer 30 are laminated in this order.

The magnetic pole layer 20 contains a magnetic flux generated in the thin film coil 13, and emits the magnetic flux toward the recording medium to perform magnetic processing (recording). The magnetic pole layer 20 extends from the air bearing surface 40 to the rear, more specifically, to a position corresponding to the back gap 12BG disposed in the gap layer 12.

As shown in FIG. 2, the magnetic pole layer 20 has a planar shape including a uniform width region R1 with a minute uniform width W1 (W1=approximately 0.1 μm to 0.3 μm) which determines the recording track width of the recording medium and a widening region R2 with a width W2 larger than the width W1 of the uniform width region R1 (W2>W1) in order from the air bearing surface 40. A position where the width of the magnetic pole layer 20 expands from the uniform width region R1 to the widening region R2 is "a first flare point FP1 (a first widening position)" which is one of important factors in determining the recording performance of the thin film magnetic head.

In particular, as shown in FIGS. 1A and 1B through 3, the magnetic pole layer 20 includes an auxiliary magnetic pole layer 8 buried in the insulating layer 9 and a main magnetic pole layer 10 buried in the insulating layer 11 which are laminated in this order, that is, the magnetic pole layer 20 has a laminate structure in which the main magnetic pole layer 10 is disposed on a trailing side of the auxiliary magnetic pole layer 8. When the movement of the recording medium toward the medium travel direction D shown in FIGS. 1A, 1B and 3 is considered as a flow, the "trailing side" means a side where the flow outgoes (the medium travel direction D), and in this case, the trailing side is a top side in a thickness direction (Z-axis direction). On the other hand, a side where the flow incomes (opposite to the medium travel direction D) is called "leading side", and in this case, the leading side is a bottom side in the thickness direction.

The auxiliary magnetic pole layer 8 functions as a main magnetic flux containing portion, and is made of, for example, a magnetic material with a high saturated magnetic flux density such as an iron-cobalt-based alloy. As the iron-cobalt-based alloy, for example, an iron cobalt alloy (FeCo), an iron cobalt nickel alloy (FeCoNi) or the like is cited. The auxiliary magnetic pole layer 8 extends from a position behind the air bearing surface 40 to the rear, more specifically from the first flare point FP1 to a position corresponding to the back gap 12BG, and is disposed adjacent to the main magnetic pole layer 10 and has a connection with the main magnetic pole layer 10. In the description, "connection" means being physically contact with something to be connected to it and being magnetically connected to it to be able to bring in conduction, and the meaning of "connection" is the same in the following description. A distance from the air bearing surface 40 as a reference to the auxiliary magnetic pole layer 8 in a rear direction (that is, a neck height NH which will be described later) is approximately 0.05 µm to 0.5 µm. An end surface of the auxiliary magnetic pole layer 8 on the trailing side is planarized together with, for example, an end surface of the insulating layer 9 on the trailing side. In other words, a flat surface M1 is formed so as to include the end surface of the auxiliary magnetic pole layer 8 on the trailing side and the end surface of the insulating layer 9 on the trailing side.

In particular, for example, as shown in FIGS. 2 and 3, the auxiliary magnetic pole layer 8 determines a planar shape of the widening region R2, and has the width W2 corresponding to the widening region R2. More specifically, the width of the auxiliary magnetic pole layer 8 includes the uniform width W2 in a rear portion thereof and a width which gradually decreases from the width W2 to the width W1 toward the first flare point FP1 in a front portion thereof. In the auxiliary magnetic pole layer 8, for example, as shown in FIG. 3, the thickness of a region except a region adjacent to the main magnetic pole layer 10 (a region not adjacent to the main magnetic pole layer 10) is thinner than the thickness of the region adjacent to the main magnetic pole layer 10, that is, the auxiliary magnetic pole layer 8 includes, for example, an adjacent portion 8A (a third magnetic pole layer portion) disposed adjacent to the main magnetic pole layer 10 and having a thickness T1 (a first thickness) and a nonadjacent portion 8B (a fourth magnetic pole layer portion) disposed nonadjacent to the main magnetic pole layer 10 and having a thickness T2 smaller than the thickness T1 of the adjacent portion 8A (T2<T1; a second thickness). A difference between the thicknesses in the auxiliary magnetic pole layer 8, that is, a difference between the thickness T1 of the adjacent portion 8A and the thickness T2 of the nonadjacent portion 8B (T1-T2) is approximately 0.05 µm or more, and preferably approximately 0.05 µm to 0.15 µm. In addition, the thickness T2 of the nonadjacent portion 8B gradually decreases with an increase in a distance from a front end portion 10A, which will be described later, of the main magnetic pole layer 10 in a width direction (X-axis direction) by an effect of etching in a step of forming the auxiliary magnetic pole layer 8, that is, the nonadjacent portion 8B has a surface inclined downward with an increase in the distance from the front end portion 10A.

The main magnetic pole layer 10 functions as a main magnetic flux emitting portion, and is made of, for example, a magnetic material with a high saturated magnetic flux density such as an iron-cobalt-based alloy as in the case of the auxiliary magnetic pole layer 8. The main magnetic pole layer 10 extends from the air bearing surface 40 to the rear, more specifically from the air bearing surface 40 to a position corresponding to the back gap 12BG.

In particular, the main magnetic pole layer 10 determines a planar shape of the uniform width region R1, and, for example, as shown in FIGS. 2 and 3, the main magnetic pole layer 10 includes the front end portion 10A (a first magnetic pole layer portion) which extends from the air bearing surface 40 to the rear through the first flare point FP1 and has the width W1 corresponding to the uniform width region R1 and a rear end portion 10B (a second magnetic pole layer portion) which is connected to the rear of the front end portion 10A and has a width W3 larger than the width W1 of the front end portion 10A (W3>W1) in order from the air bearing surface 40. As described above, although the width W3 of the rear end portion 10B is larger than the width W1 of the front end portion 10A, the width W3 of the rear end portion 10B is smaller than the width W2 of the auxiliary magnetic pole layer 8 (W1<W3<W2). A position where the width of the main magnetic pole layer 10 expands from the front end portion 10A to the rear end portion 10B is "a second flare point FP2 (a second widening position)" related to the recording performance of the thin film magnetic head.

The front end portion 10A is a portion which substantially emits the magnetic flux generated in the thin film coil 13 to the recording medium, and has an exposed surface M2 exposed to the air bearing surface 40. As shown in FIG. 3, for example, the exposed surface M2 has a shape in which the width gradually decreases from the trailing side to the leading side, that is, a symmetrical inverted trapezoidal shape which has an edge (Trailing edge) TE positioned on the trailing side and having the width W1 as an upper base and an edge (leading edge) LE positioned on the leading side and having a width W5 smaller than the width W1 (W5<W1) as a lower base. The trailing edge TE of the front end portion 10A is a substantial recording point in the main magnetic pole layer 10. The front end portion 10A has a shape corresponding to the exposed surface M2 in a length direction (Y-axis direction) in cross section.

The rear end portion 10B is a portion which contains a part of the magnetic flux contained in the auxiliary magnetic pole layer 8 to supply the magnetic flux to the front end portion 10A. The width of the rear end portion 10B includes, for example, the uniform width W3 in a rear portion thereof and a width which gradually decreases from the width W3 to the width W1 toward the second flare point FP2 in a front portion thereof.

A distance determined on the basis of the first flare point FP1, that is, a distance between the air bearing surface 40 and the first flare point FP1 is "a neck height NH (µm)" which is one of important factors in determining the recording performance of the thin film magnetic head. Moreover, a distance determined on the basis of the second flare point FP2, that is, a distance between the first flare point FP1 and the second flare point FP2 is "a flare height FH (µm)" related to the recording performance of the thin film magnetic head. Relationships of NH≦FH and 0.40<FH/(FH+NH)<0.84 between the flare height FH and the neck height NH are established. On the basis of the relationships, for example, in the case where the neck height NH is 0.15 µm, the flare height FH is preferably within a range of larger than approximately 0.1 µm and smaller than 0.8 µm(0.1 µm<FH<0.8 µm).

The insulating layer 9 electrically separates the auxiliary magnetic pole layer 8 from its surroundings, and is made of, for example, a non-magnetic insulating material such as alumina. In the insulating layer 9, for example, as shown in FIG. 3, like the auxiliary magnetic pole layer 8, a region of the insulating layer 9 except for a region adjacent to the main magnetic pole layer 10 (a region nonadjacent to the main magnetic pole layer 10) has a thinner thickness than the region adjacent to the main magnetic pole layer 10. As described above, for example, an end surface of the insulating layer 9 on the trailing side and an end surface of the auxiliary magnetic pole layer 8 on the trailing side forms a flat surface M1.

The insulating layer 11 electrically separates the main magnetic pole layer 10 from its surroundings, and is made of, for example, a non-magnetic insulating material such as alumina.

The gap layer 12 forms a gap for magnetically separating the magnetic pole layer 20 from the write shield layer 30. The gap layer 12 is made of, for example, a non-magnetic insulating material such as alumina with a thickness of approximately 0.2 μm or less.

The thin film coil 13 generates a magnetic flux for recording, and is made of, for example, a high conductive material such as copper (Cu). As shown in FIG. 2, the thin film coil 13 has, for example, a winding structure spirally wound around the back gap 12BG. In FIGS. 1A, 1B and 2, only a part of a plurality of windings constituting the thin film coil 13 is shown.

The insulating layer 14 is laid over the thin film coil 13 to electrically separate the thin film coil 13 from its surroundings, and is disposed on the gap layer 12 so that the back gap 12BG is not covered with the insulating layer 14. The insulating layer 14 is made of, for example, a photoresist (photosensitive resin) or spin-on glass (SOG) exhibiting liquidity by heating, and a near-edge portion of the insulating layer 14 has a rounded inclined surface. The forefront position of the insulating layer 14 is "a throat height zero position TP" which is one of important factors in determining the recording performance of the thin film magnetic head, and a distance between the air bearing surface 40 and the throat height zero position TP is "a throat height TH". In FIGS. 1A, 1B and 2, the throat height zero position TP matches the first flare point FP1, that is, a state in which the throat height TH matches the neck height NH is shown.

The write shield layer 30 takes in a spread portion of the magnetic flux emitted from the magnetic pole layer 20 to prevent the spread of the magnetic flux. The write shield layer 30 extends from the air bearing surface 40 to the rear on the trailing side of the magnetic pole layer 20, and more specifically, the write shield layer 30 extends so as to be separated from the magnetic pole layer 20 by the gap layer 12 on a side closer to the air bearing surface 40 and be connected to the magnetic pole layer 20 through the back gap 12BG on a side farther from the air bearing surface 40. In particular, the write shield layer 30 includes two different components, that is, a TH determining layer 15 which functions as a main magnetic flux uptake opening and a yoke layer 16 which functions as a flow path for the magnetic flux taken in by the TH determining layer 15.

The TH determining layer 15 is disposed adjacent to the gap layer 12, and extends from the air bearing surface 40 to a position between the air bearing surface 40 and the back gap 12BG, more specifically to a position between the air bearing surface 40 and the thin film coil 13. The TH determining layer 15 is made of, for example, a magnetic material with a high saturated magnetic flux density such as Permalloy or an iron-cobalt-based alloy, and has a rectangular planar shape with the width W4 larger than the width W2 of the magnetic pole layer 20 (W4>W2), as shown in FIG. 2. The insulating layer 14 in which the thin film coil 13 is buried is disposed adjacent to the TH determining layer 15, that is, the TH determining layer 15 determines the forefront position of the insulating layer 14 (the throat height zero position TP), and more specifically, the TH determining layer 15 plays a role in determining the throat height TH.

The yoke layer 16 extends from the air bearing surface 40 to a position corresponding to the back gap 12BG so that the insulating layer 14 is covered with the yoke layer 16, and in the yoke layer 16, a front portion thereof is laid on the TH determining layer 15 so as to be connected to the TH determining layer 15 and a rear portion thereof is disposed adjacent to the magnetic pole layer 20 so as to be connected to the magnetic pole layer 20 through the back gap 12BG. The yoke layer 16 is made of, for example, a magnetic material with a high saturated magnetic flux density such as Permalloy or an iron-cobalt-based alloy as in the case of the TH determining layer 15, and as shown in FIG. 2, the yoke layer 16 has a rectangular planar shape with the width W4.

Next, referring to FIGS. 1A and 1B through 4, the actions of the thin film magnetic head will be described below.

In the thin film magnetic head, at the time of recording information, when a current flows into the thin film coil 13 of the recording head portion 10B through an external circuit (not shown), a magnetic flux is generated in the thin film coil 13. After the magnetic flux generated at this time is contained in the magnetic pole layer 20, the magnetic flux flows to the front end portion 10A of the main magnetic pole layer 10 in the magnetic pole layer 20. At this time, the magnetic flux flowing through the magnetic pole layer 20 is concentrated at the first flare point FP1 with a decrease in the width of the magnetic pole layer 20, so the magnetic flux is focused on a portion of the exposed surface M2 of the front end portion 10A in proximity to the trailing edge TE. When the magnetic flux focused on the portion in proximity to the trailing edge TE is emitted from the exposed surface M2 of the front end portion 10A to outside, a recording magnetic field (a perpendicular magnetic field) is generated in a direction perpendicular to a surface of the recording medium, and the recording medium is magnetized in a perpendicular direction by the perpendicular magnetic field, so information is magnetically recorded on the recording medium. At the time of recording information, a spread portion of the magnetic flux emitted from the exposed surface M2 of the front end portion 10A is taken in by the write shield layer 30, so the spread of the magnetic flux can be prevented. The magnetic flux taken in by the write shield layer 30 is returned to the magnetic pole layer 20 through the back gap 12BG.

On the other hand, at the time of reproducing information, when a sense current flows into the MR device 6 of the reproducing head portion 100A, the resistance of the MR device 6 is changed depending upon a signal magnetic field for reproducing from the recording medium. A change in the resistance is detected as a change in the sense current so that the information recorded on the recording medium is magnetically read out.

Next, referring to FIGS. 1A and 1B through 15, a method of manufacturing the thin film magnetic head shown in FIGS. 1A and 1B through 4 will be described below. FIGS. 5A and 5B through 15 show each step in the method of manufacturing the thin film magnetic head. FIGS. 5A and 5B through 11A and 11B show sectional views corresponding to FIGS. 1A and 1B, and FIG. 12 through 15 show perspective views corresponding to FIG. 3. FIGS. 12, 13, 14 and 15 correspond to FIGS. 6A and 6B, 8A and 8B, 10A and 10B, and 11A and 11B, respectively.

At first, the method of manufacturing the thin film magnetic head will be briefly described below referring to FIGS. 1A and 1B, and then a method of forming a main part (that is, the magnetic pole layer 20) of the thin film magnetic head will be described in detail below. The materials, dimensions and structural characteristics of components of the thin magnetic head will not be further described, because they have been already described above.

The thin film magnetic head is manufactured through laminating each component in order mainly through the use of existing thin film processes including film formation techniques such as plating and sputtering, patterning techniques such as photolithography, etching techniques such as dry etching and wet etching, and so on. More specifically, at first, as shown in FIGS. 1A and 1B, after the insulating layer 2 is formed on the substrate 1, the bottom read shield layer 3, the shield gap film 4 in which the MR device 6 is buried, and the top read shield layer 5 are laminated in this order on the insulating layer 2 so as to form the reproducing head portion 10A. Next, after the separating layer 7 is formed on the reproducing head portion 100A, on the separating layer 7, the magnetic pole layer 20 (the auxiliary magnetic pole layer 8 and the main magnetic pole layer 10) which is buried in the insulating layers 9 and 11, the gap layer 12 including the back gap 12BG, the insulating layer 14 in which the thin film coil 13 is buried, and the write shield layer 30 (the TH determining layer 15 and the yoke layer 16) are laminated in this order so as to form the recording head portion 100B. Finally, after the overcoat layer 17 is formed on the recording head portion 100B, the air bearing surface 40 is formed through machining or polishing to complete the thin film magnetic head.

Figures 5A, 5B:
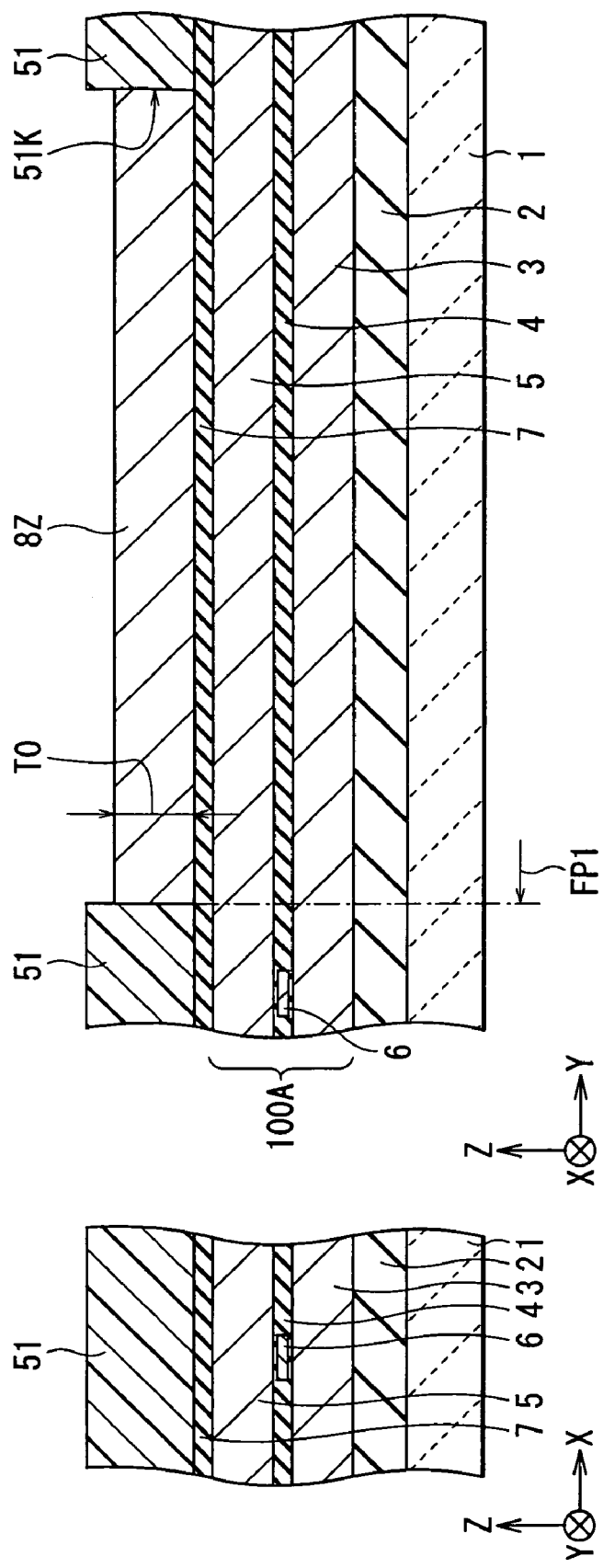
FIGS. 5A and 5B are sectional views for describing one step in a method of manufacturing the thin film magnetic head according to the embodiment of the invention.

When the main part of the thin film magnetic head is formed, after forming the separating layer 7, at first, as shown in FIGS. 5A and 5B, a photoresist pattern 51 for forming a precursor magnetic pole layer 8Z which will be described later is formed on the separating layer 7.

A step of forming the photoresist pattern 51 will be described as below. At first, a seed layer (not shown) as an electrode layer is formed on the separating layer 7 through sputtering. As the material of the seed layer, for example, the same magnetic material as that of the precursor magnetic pole layer 8Z is used. Next, after a photoresist is applied to the seed layer to form a photoresist film, the photoresist film is patterned through photolithography to form the photoresist pattern 51. The photoresist pattern 51 is formed so as to have an opening 51K corresponding to a planar shape of the precursor magnetic pole layer 8Z. As the material of the photoresist pattern 51, for example, either a positive photoresist or a negative photoresist can be used.

Next, a plating film is selectively grown in the opening 51K of the photoresist pattern 51 through the use of the seed layer formed in the former step and the photoresist pattern 51 to pattern-form the precursor magnetic pole layer 8Z as shown in FIGS. 5A and 5B. The precursor magnetic pole layer 8Z is a preliminary layer which will become the auxiliary magnetic pole layer 8 through polishing and etching in a later step, and the precursor magnetic pole layer 8Z has the same planar shape as that of the auxiliary magnetic pole layer 8. The precursor magnetic pole layer 8Z is formed so as to have a thickness T0 larger than the thickness T1 of the auxiliary magnetic pole layer 8 (an adjacent portion 8A) (T0>T1) and be disposed approximately 0.05 μm to 0.5 μm behind a position where the air bearing surface 40 (refer to FIGS. 1A and 1B) is formed. The thickness of photoresist pattern 51 and the forming position of the opening 51K are adjusted in a former step so that the precursor magnetic pole layer 8Z has the thickness T0 and is disposed approximately 0.05 μm to 0.5 μm behind the position where the air bearing surface 40 is formed. In particular, the forefront position of the precursor magnetic pole layer 8Z becomes a position which determines the first flare point FP1.

Figures 6A, 6B:
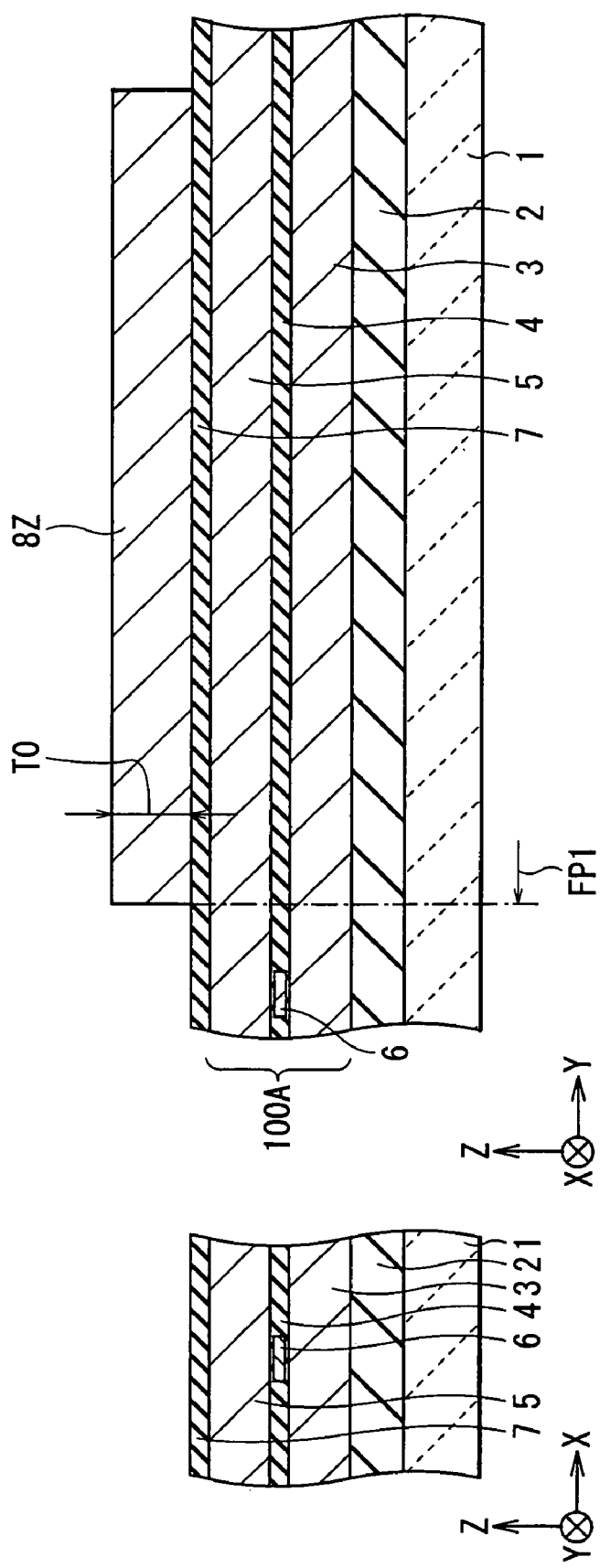
FIGS. 6A and 6B are sectional views for describing a step following the step of FIGS. 5A and 5B.
Figure 8B:
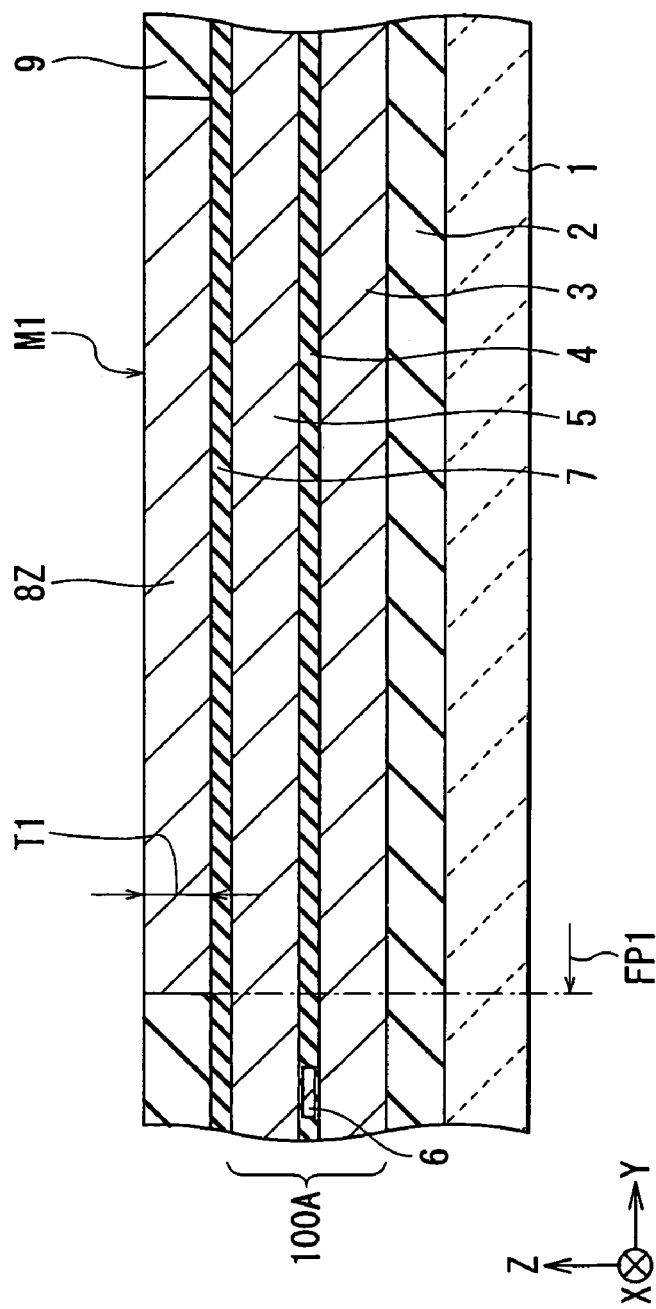
FIGS. 8A and 8B are sectional views for describing a step following the step of FIGS. 7A and 7B.
Figure 8A:
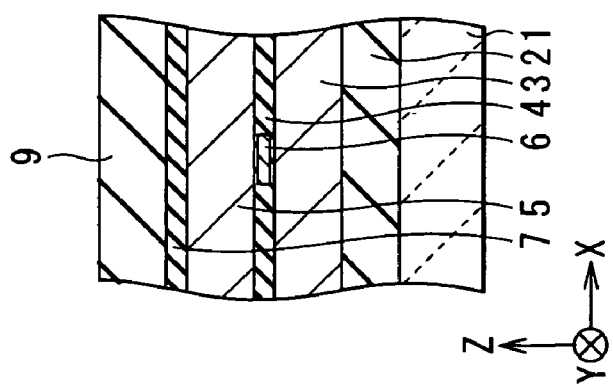
Figure 12:
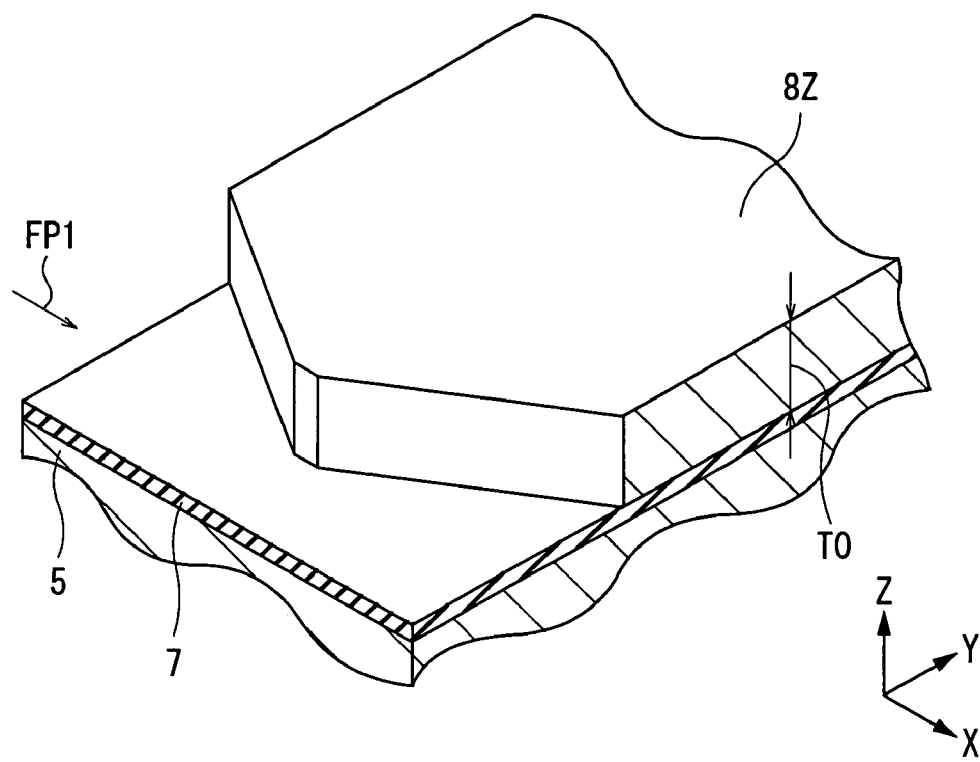
FIG. 12 is a perspective view corresponding to the sectional views of FIGS. 6A and 6B.
Figure 13:
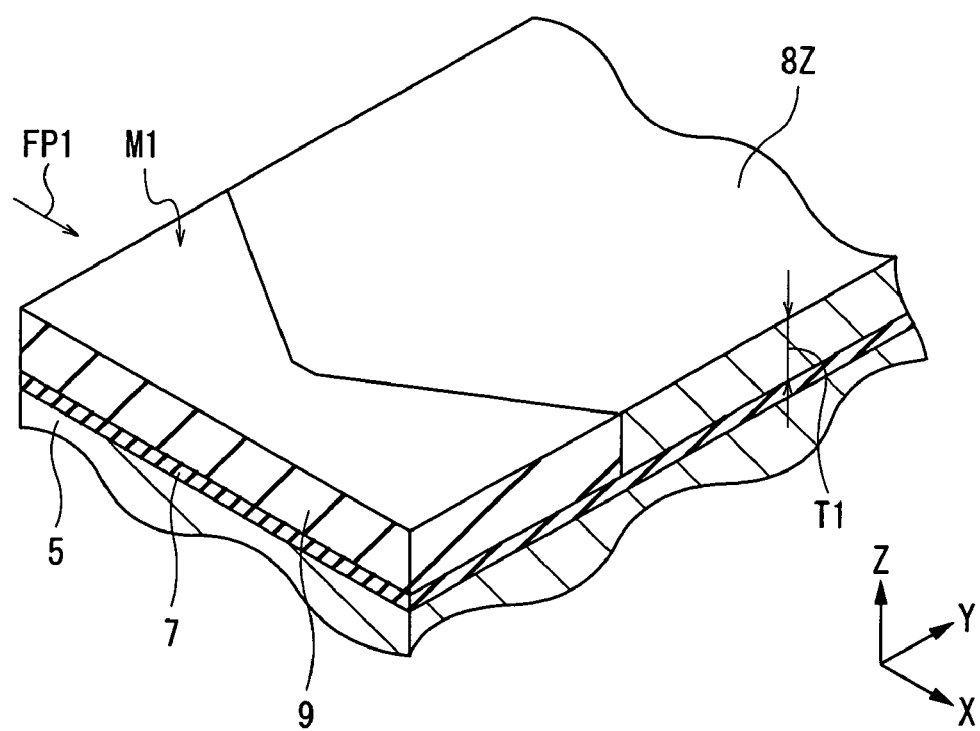
FIG. 13 is a perspective view corresponding to the sectional views of FIGS. 8A and 8B.

Next, as shown in FIGS. 6A, 6B and 12, only the precursor magnetic pole layer 8Z is left on the separating layer 7 through removing the used photoresist pattern 51. After that, the used seed layer (not shown) is etched through the use of the precursor magnetic pole layer 8Z as a mask, for example, though ion milling to selectively remove a region of the seed layer except for a region of the seed layer corresponding to the precursor magnetic pole layer 8Z.

Next, as shown in FIGS. 7A and 7B, the insulating layer 9 is formed though, for example, sputtering so that the precursor magnetic pole layer 8Z and the separating layer 7 around the precursor magnetic pole layer 8Z are covered with the insulating layer 9. For example, the insulating layer 9 is formed so that the bottom surface of the insulating layer 9 is higher than the top surface of the precursor magnetic pole layer 8Z, that is, the precursor magnetic pole layer 8Z is completely buried in the insulating layer 9.

Then, the insulating layer 9 and the precursor magnetic pole layer 8Z are polished through, for example, CMP (Chemical Mechanical Polishing) to form the flat surface M1 including an end surface of the precursor magnetic pole layer 8Z on the trailing side and an end surface of the insulating layer 9 on the trailing side. For example, the flat surface M1 is formed through polishing until the whole thickness of the precursor magnetic pole layer 8Z is reduced from T0 to T1.

Next, as shown in FIGS. 9A and 9B, a photoresist pattern 52 for forming the main magnetic pole layer 10 is formed on the flat surface M1. A step of forming the photoresist pattern 52 (including the seed layer) is the same as the step of forming the photoresist pattern 51 formed in a former step. The photoresist pattern 52 is formed so that an opening 52K corresponding to the planar shape of the main magnetic pole layer 10 is included and, specifically as shown in FIG. 9A, the width of the opening 52K is gradually reduced with a decrease in a distance from the flat surface M1.

Then, a plating film is selectively grown in the opening 52K of the photoresist pattern 52 though the use of the seed layer and the photoresist pattern 52 to pattern-form the main magnetic pole layer 10 including the front end portion 10A and the rear end portion 10B, as shown in FIG. 9A and 9B. When the main magnetic pole layer 10 is formed, on the basis of a characteristic pattern structure of the photoresist pattern 52 in which the width of the opening 52K is gradually reduced with a decrease in a distance from the flat surface M1, as shown in FIG. 9A, the front end portion 10A is formed so as to have a symmetrical inverted trapezoidal shape in cross section.

Figure 14:
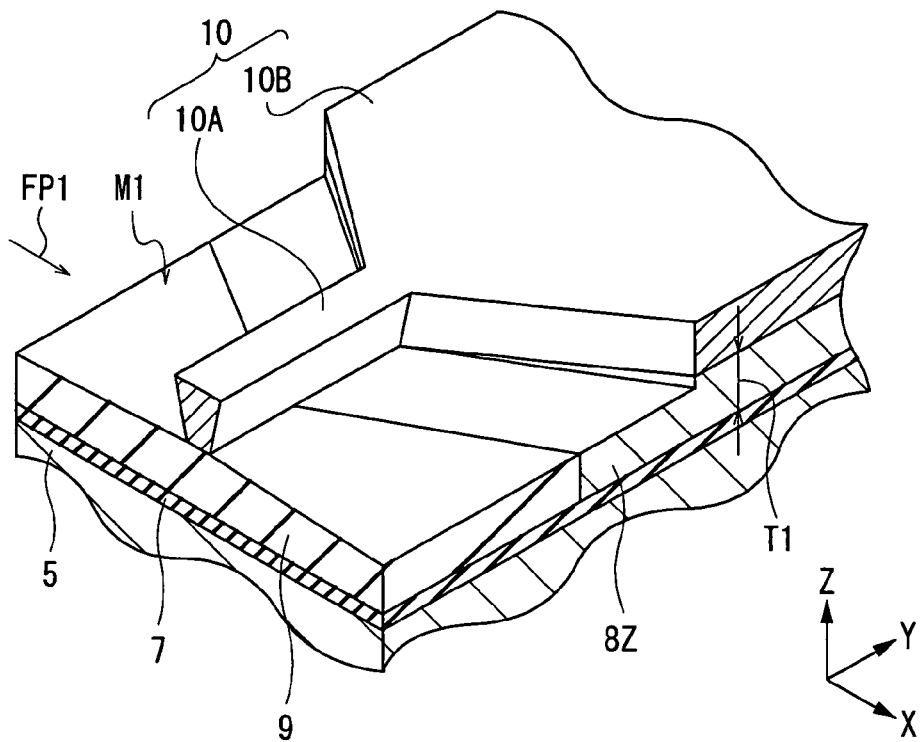
FIG. 14 is a perspective view corresponding to the sectional views of FIGS. 10A and 10B.

Next, after the used photoresist pattern 52 is removed, the used seed layer (not shown) is etched through using the main magnetic pole layer 10 as a mask by, for example, ion milling to selectively remove a region of the seed layer except for a region of the seed layer corresponding to the main magnetic pole layer 10. Thereby, as shown in FIGS. 10A, 10B and 14, only the main magnetic pole layer 10 is left on the flat surface M1. When the seed layer is etched, on the basis of the fact that the front end portion 10A in the main magnetic pole layer 10 used as a mask has a symmetrical inverted trapezoidal shape in cross section, a hidden region in a range where an etching effect is exerted is produced due to the structural characteristic of the front end portion 10A, so the etching amount gradually increases with an increase in a distance from the front end portion 10A in the width direction (X-axis direction). Thereby, at the time when the seed layer is removed in a region near the front end portion 10A, after the seed layer is removed, a region of the precursor magnetic pole layer 8Z and a region of the insulating layer 9 away from the front end portion 10A are slightly removed, so in a region around the front end portion 10A, the precursor magnetic pole layer 8Z and the insulating layer 9 are inclined downward with an increase in the distance from the front end portion 10A.

Figures 11A, 11B:
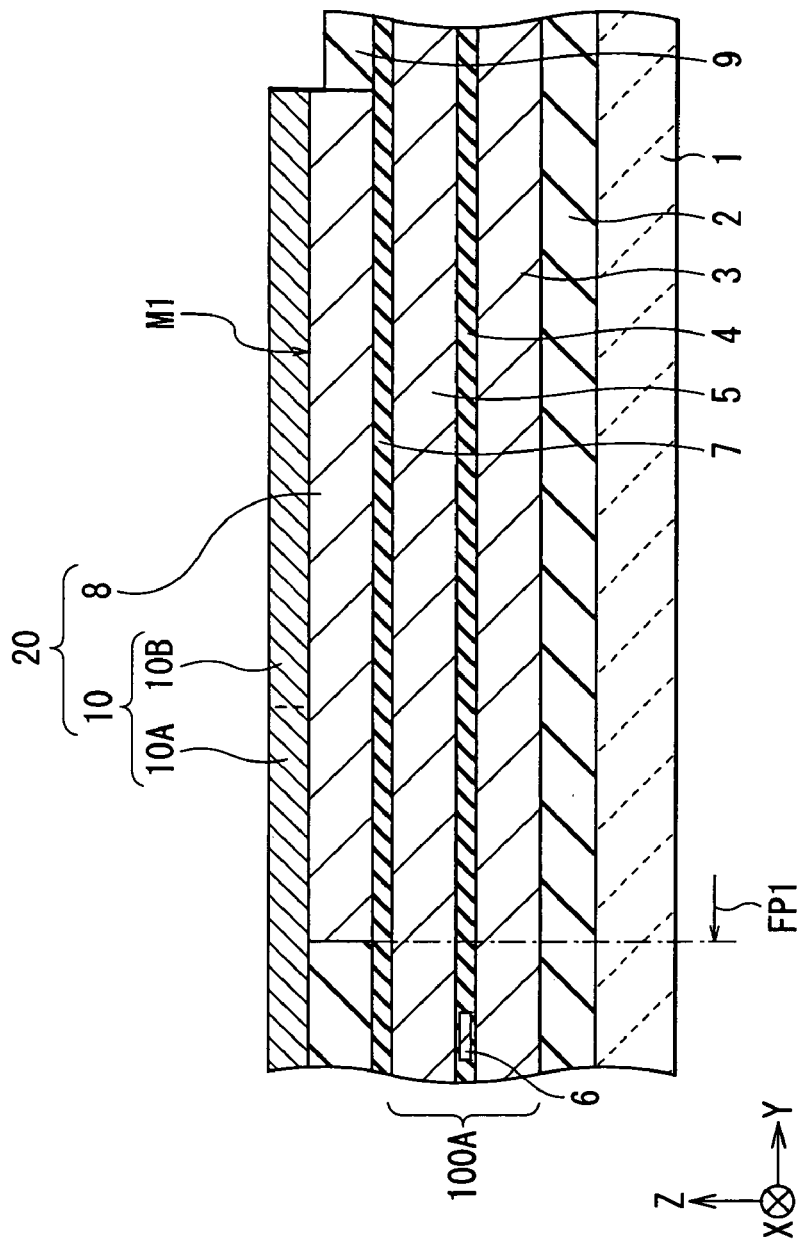
FIGS. 11A and 11B are sectional views for describing a step following the step of FIGS. 10A and 10B.
Figure 15:
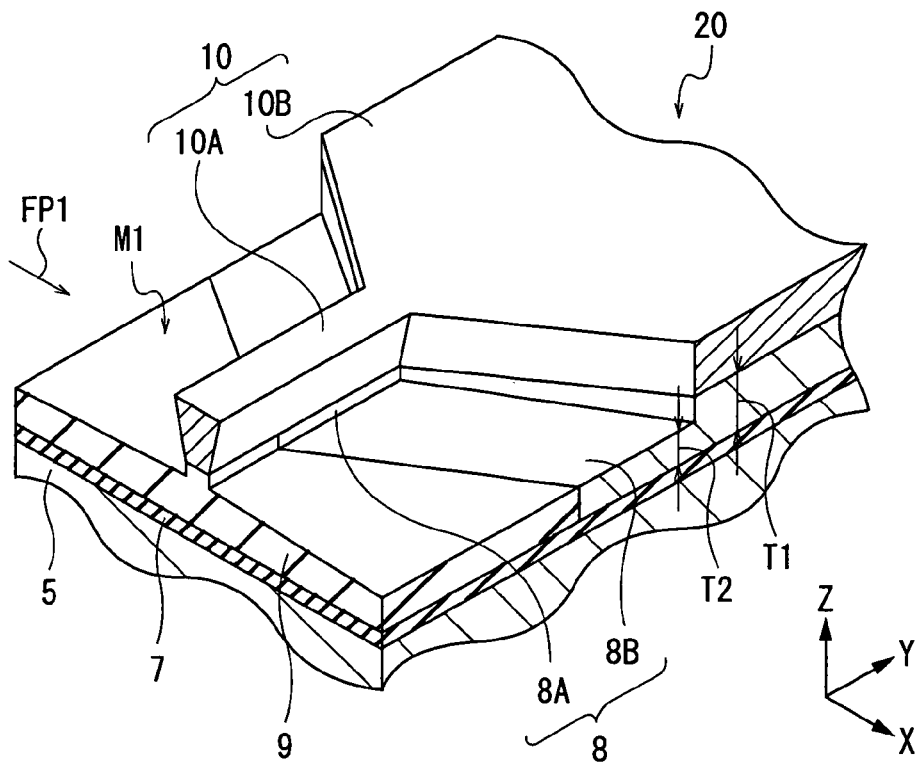
FIG. 15 is a perspective view corresponding to the sectional views of FIGS. 11A and 11B.

Finally, when the precursor magnetic pole layer 8Z and the insulating layer 9 are etched through using the main magnetic pole layer 10 as a mask to be slightly removed, as shown in FIGS. 11A, 11B and 15, the auxiliary magnetic pole layer 8 including the adjacent portion 8A (with the thickness T1) and the nonadjacent portion 8B (with the thickness T2) is formed. When the auxiliary magnetic pole layer 8 is formed, for example, etching is performed until the thickness of the nonadjacent portion 8B is reduced to T1 to T2, more specifically the precursor magnetic pole layer 8Z is removed to a depth of approximately 0.05 μm to 0.15 μm. Thereby, the magnetic pole layer 20 with a laminate structure in which the auxiliary magnetic pole layer 8 (the adjacent portion 8A and the nonadjacent portion 8B) and the main magnetic pole layer 10 (the front end portion 10A and the rear end portion 10B) are laminated in this order is completed.

In the above description, for the sake of simplification of the description, at the time of FIGS. 11A, 11B and 15, the magnetic pole layer 20 (the auxiliary magnetic pole layer 8 and the main magnetic pole layer 10) is substantially completed; however, in a precise sense, the air bearing surface 40 is formed in a later step. In other words, when the exposed surface M2 (refer to FIG. 4) of the main magnetic pole layer 10 is formed, the magnetic pole layer 20 (the auxiliary magnetic pole layer 8 and the main magnetic pole layer 10) is finally completed.

In the method of manufacturing the thin film magnetic head according to the embodiment, the magnetic pole layer 20 is formed so as to have a laminate structure in which the auxiliary magnetic pole layer 8 (the adjacent portion 8A and the nonadjacent portion 8B) extending from the first flare point FP1 to the rear and determining the planar shape of the widening region R2, and the main magnetic pole layer 10 (the front end portion 10A and the rear end portion 10B) extending from the air bearing surface 40 to the rear through the first flare point FP1 and determining the planar shape of the uniform width region R1 are laminated in this order, so as a result of obtaining advantages on the following three points, the thin film magnetic head with as high performance as possible can be manufactured.

Firstly, as shown in FIGS. 7A and 7B through 10A and 10B, 13 and 14, after the flat surface M1 is formed through polishing the precursor magnetic pole layer 8Z and the insulating layer 9 to be planarized, the main magnetic pole layer 10 is formed on the flat surface M1, so compared to the case where the main magnetic pole layer 10 is formed on an uneven surface with asperities, the main magnetic pole layer 10 can be formed with high precision. It is because the photoresist pattern 52 used for forming the main magnetic pole layer 10 is formed on the flat surface M1, so when a photoresist film is exposed to form the photoresist pattern 52, a reflective angle range of reflective light generated from a base (a seed layer) is narrower, thereby it is difficult to expand the exposed region (a region where the opening 52K is formed) in the photoresist film. In this case, in particular, the front end portion 10A, which is a portion substantially determining the recording track width, in the main magnetic pole layer 10 can be formed with high precision so as to have a target minute uniform width W1, so the recording track width of the recording medium can be controlled with high precision by the width W1 of the front end portion 10A.

Secondly, as shown in FIG. 2, the main magnetic pole layer 10 is formed so as to include the front end portion 10A with the minute uniform width W1 and the rear end portion 10B with the width W3 larger than the width W1 of the front end portion 10A, so compared to the case where the main magnetic pole layer 10 is formed so as to include only the front end portion 10A and not to include the rear end portion 10B, the amount of the magnetic flux contained in the main magnetic pole layer 10 can be increased. It is because the rear end portion 10B which contains a larger amount of the magnetic flux on the basis of the width W3 larger than the width W1 is connected to the rear of the front end portion 10A which contains a smaller amount of the magnetic flux on the basis of the minute width W1, so the total amount of the magnetic flux contained in the main magnetic pole layer 10 can be secured on the basis of the existence of the rear end portion 10B. In this case, in particular, in the main magnetic pole layer 10, the magnetic flux can sufficiently and smoothly flow from the widening region R2 which includes the rear end portion 10B and is a portion containing the magnetic flux to the uniform width region R1 which includes the front end portion 10A and is a main portion emitting the magnetic flux, so recording can be stably performed in the main magnetic pole layer 10 by the sufficient and smooth flow of the magnetic flux.

Thirdly, refer to FIGS. 10A, 10B, 11A, 11B, 14 and 15, the auxiliary magnetic pole layer 8 is formed so that a region except for a region adjacent to the main magnetic pole layer 10 in the auxiliary magnetic pole layer 8 is selectively removed, that is, the auxiliary magnetic pole layer 8 is formed so as to include the adjacent portion 8A which is disposed adjacent to the main magnetic pole layer 10 and has the thickness T1 and the nonadjacent portion 8B which does not disposed adjacent to the main magnetic pole layer 10 and has the thickness T2 smaller than the thickness T1, so compared to the case where the auxiliary magnetic pole layer 8 is formed so as to have the thickness T1 as a whole, information recorded on the recording medium can be prevented from being erased without intention due to the magnetic flux contained in the auxiliary magnetic pole layer 8. It is because the nonadjacent portion 8B which contains a smaller amount of the magnetic flux on the basis of the thickness T2 smaller than the thickness T1 is disposed on the both sides of a front part of the adjacent portion 8A which contains a larger amount of the magnetic flux on the basis of the thickness T1, so the amount of the magnetic flux contained in the nonadjacent portion 8B can be reduced intentionally. In this case, in particular, the amount of the magnetic flux emitted from the auxiliary magnetic pole layer 8 (the nonadjacent portion 8B) which is not a portion originally emitting the magnetic flux in the magnetic pole layer 20 without intention can be reduced, so information recorded on the recording medium can be stably maintained by a reduction in the amount of the magnetic flux emitted without intention.

Figure 16:
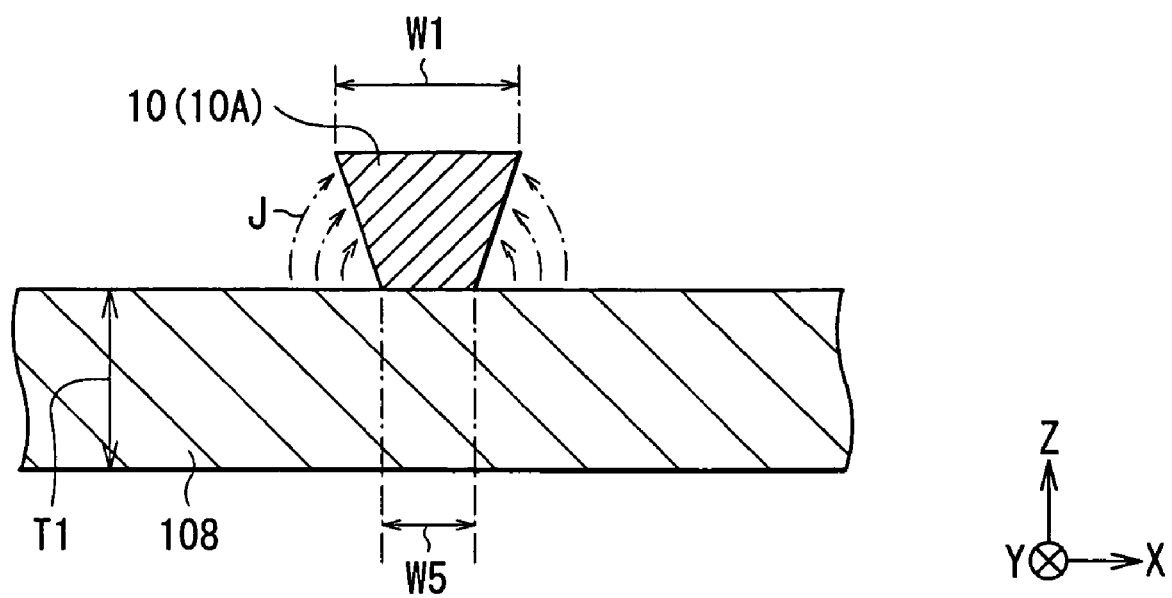
FIG. 16 is an enlarged sectional view of a part of a thin film magnetic head of a comparative example relative to the thin film magnetic head according to the embodiment of the invention.

The above third point (preventing information erasing without intention) will be described in more detail below. For example, as shown in FIG. 16 corresponding to FIG. 4, in a comparative example in which an auxiliary magnetic pole layer 108 is formed so as to have the thickness T1 as a whole, the auxiliary magnetic pole layer 108 contains an excessive amount of the magnetic flux on the basis of the thickness T1, that is, the amount of a leakage magnetic flux J (a leakage magnetic field) emitted from the auxiliary magnetic pole layer 108 without intention becomes too large, so information recorded on the recording medium is easily erased without intention due to the leakage magnetic flux J. On the other hand, as shown in FIG. 4, in the embodiment in which the auxiliary magnetic pole layer 8 is formed so as to include the adjacent portion 8A with the thickness T1 and the nonadjacent portion 8B with the thickness T2 smaller than the thickness T1, the amount of the magnetic flux contained in the auxiliary magnetic pole layer 8 becomes appropriate on the basis of a difference between the thicknesses T1 and T2, that is, the amount of the leakage magnetic flux J emitted from the auxiliary magnetic pole layer 8 without intention is reduced intentionally, so information recorded on the recording medium is not easily erased without intention due to the leakage magnetic flux J.

As described above, in the embodiment, sufficient advantages on three points of controlling the recording track width with high precision by the high precision formation of the main magnetic pole layer 10, stable recording by an increase in the amount of the magnetic flux contained in the main magnetic pole layer 10 and stable information maintenance by the prevention of information erasing without intention, so the thin film magnetic head with as high performance as possible can be manufactured.

Moreover, the thin film magnetic head according to the embodiment is manufactured through the method of manufacturing the thin film magnetic head according to the embodiment, so advantages on the above three points can be obtained. Therefore, the thin film magnetic head can achieve as high performance as possible.

Further, in the embodiment, a relationship of 0.40<FH (FH+NH)<0.84 between the neck height NH, that is, a distance between the air bearing surface 40 and the first flare point FP1, and the flare height FH, that is, a distance between the first flare point FP1 and the second flare point FP2 is established, so in terms of securing the perpendicular magnetic field strength and the forming precision of the front end portion 10A, the neck height NH and the flare height FH become appropriate. Therefore, while the neck height NH and the flare height FH are freely set, the recording magnetic field strength and the forming precision of the front end portion 10A can be secured. In this case, in particular, when the neck height NH is set to 0.15 µm, the recording magnetic field strength and the forming precision of the front end portion 10A can be secured through setting the flare height FH within a range of 0.1 µm<FH<0.8 µm.

Figure 18B:
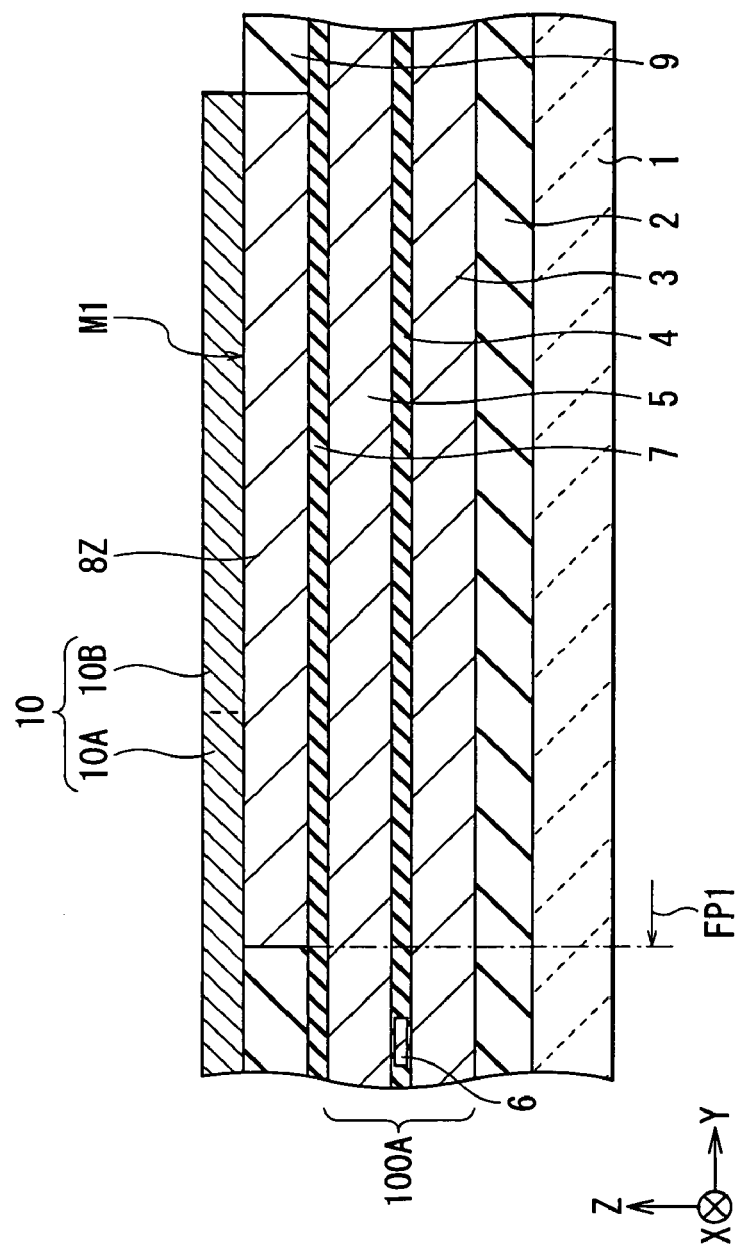
FIGS. 18A and 18B are sectional views for describing a step following the step of FIGS. 17A and 17B.
Figure 18A:
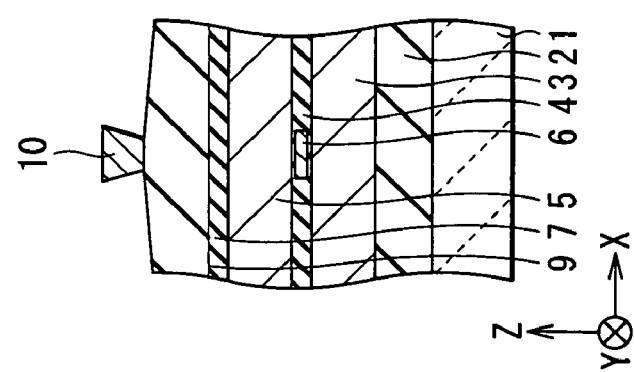

In the embodiment, as shown in FIGS. 9A, 9B, 10A and 10B, the main magnetic pole layer 10 is formed through growing a plating film through the use of the photoresist pattern 52; however, it is not necessarily limited to this case, and, for example, the main magnetic pole layer 10 may be formed through etching instead of plating. More specifically, for example, as shown in FIGS. 17A and 17B, for example, a film made of the material of the main magnetic pole layer 10 is formed through sputtering to form a magnetic material layer 53, and then after a mask 54 having a pattern shape corresponding to the planar shape of the main magnetic pole layer 10 is formed on the magnetic material layer 53 through pattern-forming alumina, as shown in FIGS. 18A and 18B, the main magnetic pole layer 10 may be formed through etching and patterning the magnetic material layer 53 through the mask 54 by, for example, ion milling or reactive ion etching (RIE). In this case, as described above referring to FIGS. 10A, 10B and 14 in the above embodiment, the precursor magnetic pole layer 8Z and the insulating layer 9 are slightly removed by the effect of etching, so the precursor magnetic pole layer 8Z and the insulating layer 9 are inclined downward with an increase in the distance from the front end portion 10A. For reference, when the magnetic material layer 53 is etched, the mask 54 is etched together with the magnetic material layer 53 so that the mask 54 is reduced. However, for example, at the time when patterning of the magnetic material layer 53 is completed (at the time when the main magnetic pole layer 10 is completed), the mask 54 may be left, or may be removed (refer to FIGS. 18A and 18B). In this case, the main magnetic pole layer 10 can be formed so as to have a desired pattern shape, so the same effects as those in the embodiment can be obtained.

Moreover, in the embodiment, as shown in FIG. 3, the exposed surface M2 of the main magnetic pole layer 10 has a symmetrical inverted trapezoidal shape, but it is not necessarily limited to this case, and the planar shape of the exposed surface M2 can be freely modified.

Figure 19:
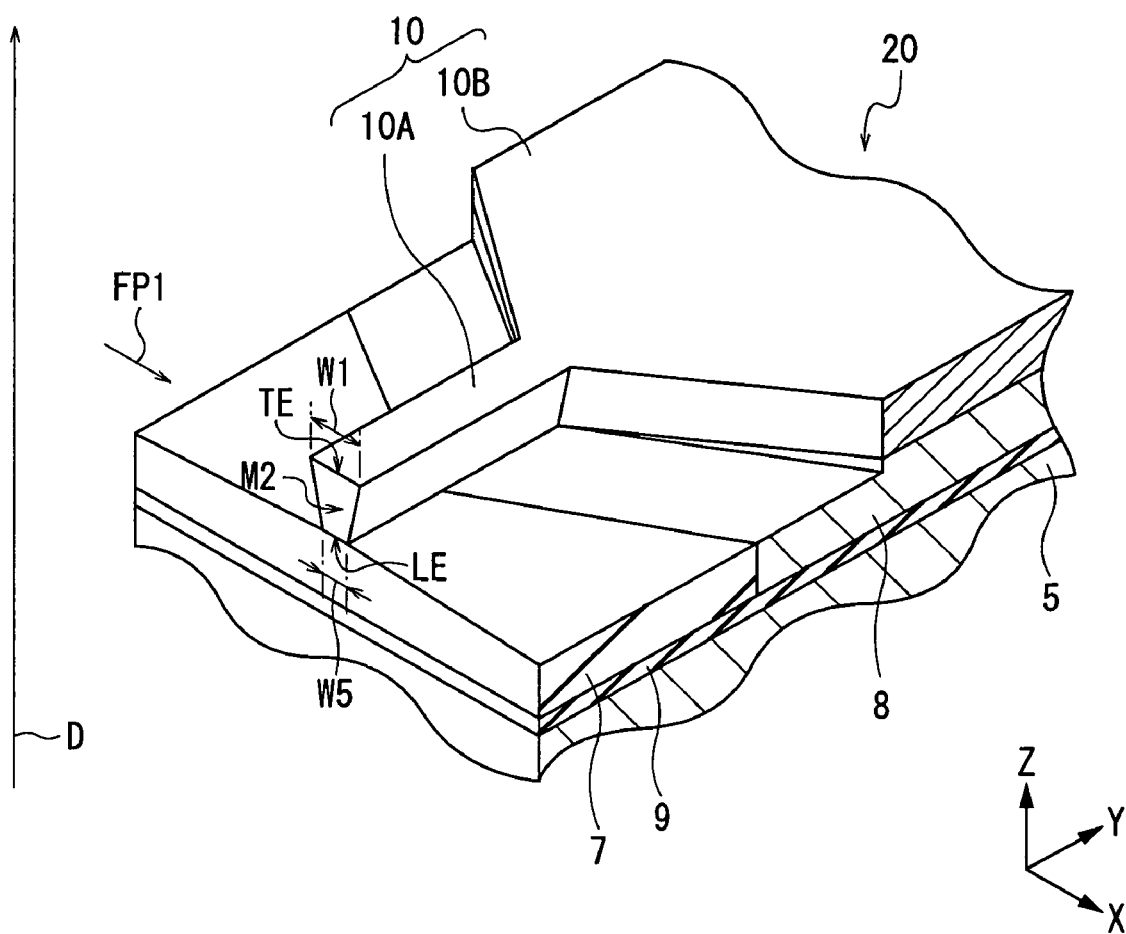
FIG. 19 is a perspective view showing a modification of the thin film magnetic head according to the embodiment of the invention.

Further, in the embodiment, as shown in FIGS. 10A, 10B, 11A and 11B, the precursor magnetic pole layer 8Z is partially etched through the use of the main magnetic pole layer 10 as a mask to be slightly removed, thereby as shown in FIG. 3, the auxiliary magnetic pole layer 8 is formed so as to include the adjacent portion 8A (with the thickness T1) and the nonadjacent portion 8B (with the thickness T2) which have different thicknesses from each other; however, it is not necessarily limited to this case. For example, as shown in FIG. 19, the precursor magnetic pole layer 8Z may be used as the auxiliary magnetic pole layer 8 without slightly removing the precursor magnetic pole layer 8Z. Characteristics relating the structure of the thin film magnetic head shown in FIG. 19 except for the above-described characteristic are the same as those in the case shown in FIG. 3.

Up to this point, the descriptions of the thin film magnetic head and the method of manufacturing the thin film magnetic head according to the embodiment of the invention are concluded.

Figure 20:
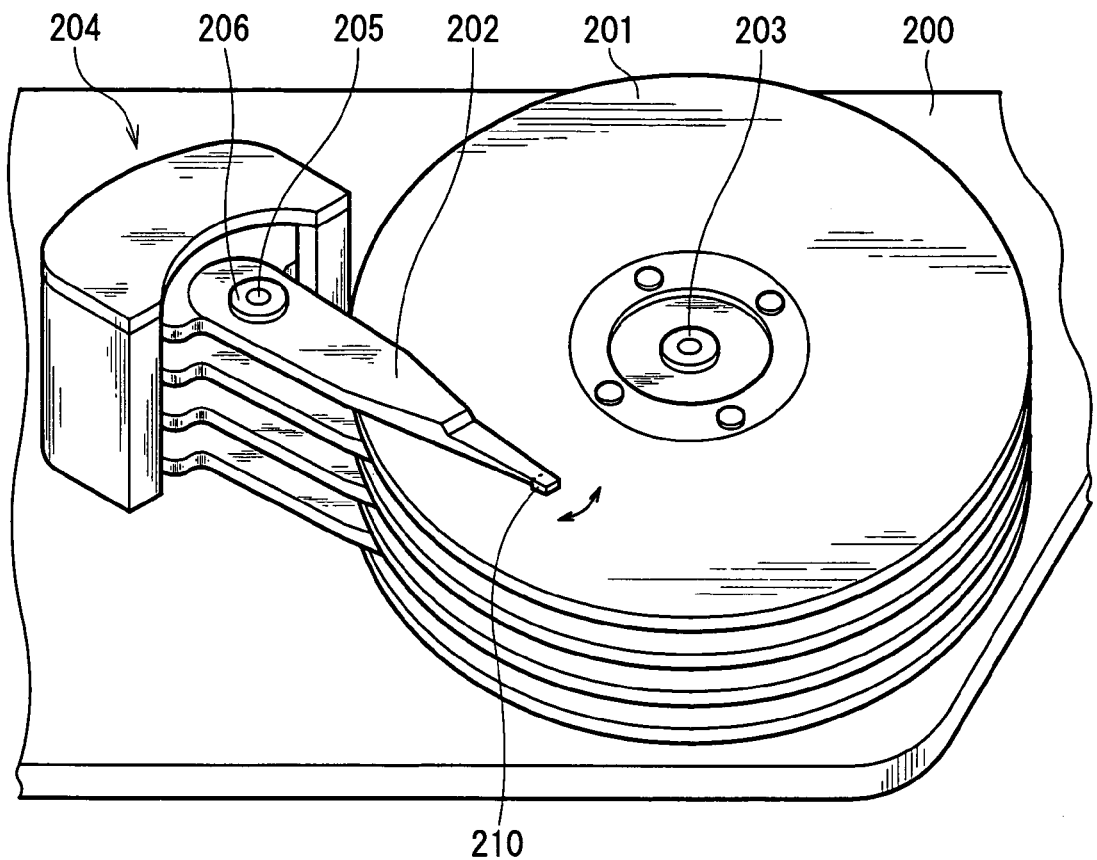
FIG. 20 is a cutaway perspective view of a magnetic recording apparatus comprising a thin film magnetic head according to the invention.
Figure 21:
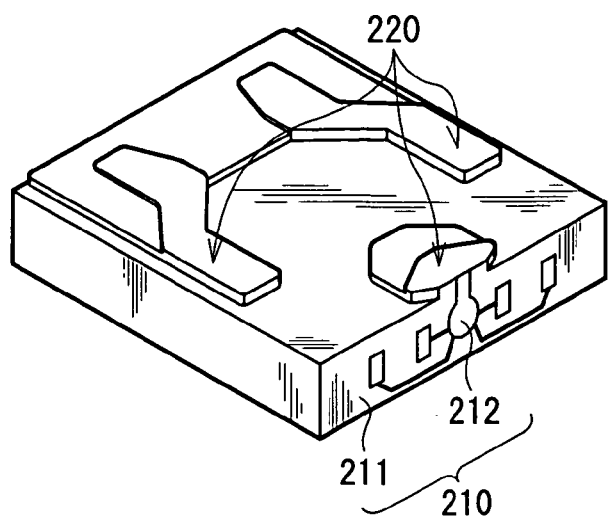
FIG. 21 is an enlarged perspective view of a main part of the magnetic recording apparatus shown in FIG. 20.

Next, referring to FIGS. 20 and 21, the structure of a magnetic recording apparatus comprising the thin film magnetic head according to the invention will be described below. FIG. 20 shows a cutaway outline view of the magnetic recording apparatus, and FIG. 21 shows an enlarged outline view of a main part of the magnetic recording apparatus. The magnetic recording apparatus comprises the thin film magnetic head according to the above embodiment. The magnetic recording apparatus is, for example, a hard disk drive.

As shown in FIG. 20, the magnetic recording apparatus comprises a plurality of magnetic disks (hard disks) 201 as recording media on which information is recorded, and a plurality of arms 202 each of which is disposed so as to correspond to each magnetic disk 201 and has a head slider 210 on an end of the arm 202 in an enclosure 200. The magnetic disks 201 are rotatable about a spindle motor 203 fixed on the enclosure 200 as a center. The arms 202 are connected to a driving portion 204 as a power source, and are pivotable about a fixed shaft 205 fixed on the enclosure 200 as a center through a bearing 206. The driving portion 204 includes, for example, a driving source such as a voice coil motor. FIG. 20 shows, for example, a model in which the plurality of arms 202 integrally pivot about the fixed shaft 205 as a center.

As shown in FIG. 21, the head slider 210 has a structure in which a perpendicular recording system thin film magnetic head 212 is disposed on a side surface perpendicular to an air bearing surface 220 (a surface on a right front side in FIG. 21) of a substantially-rectangular-shaped substrate 211 having an uneven surface (the air bearing surface 220) so as to reduce air resistance while the arms 202 pivot. The thin film magnetic head 212 has, for example, the structure described in the above embodiment. In order to easily show a structure of the head slider 210 viewed from a side closer to the air bearing surface 220, FIG. 21 shows the head slider 210 turned upside down from a state of FIG. 20.

The structure of the thin film magnetic head 212 has already described in detail in the above embodiment, and will not be further described.

In the magnetic recording apparatus, the arm 202 pivots during recording information so that the head slider 210 moves to a predetermined region (recording region) of the magnetic disk 201. Then, when the thin film magnetic head 212 is electrically conducted in a state of facing the magnetic disk 201, the thin film magnetic head 212 acts as described in the embodiment so as to magnetically record the information on the magnetic disk 201.

As the magnetic recording apparatus comprises the thin film magnetic head 212 according to the invention, the magnetic recording apparatus comprising the thin film magnetic head can achieve as high performance as possible.

Structures, actions, functions, effects and modifications regarding the thin film magnetic head 212 mounted in the magnetic recording apparatus are equivalent to those in the embodiment, so they will not be further described.

EXAMPLE

Next, an example of the invention will be described below.

When various characteristics of the thin film magnetic head described in the above embodiment (refer to FIGS. 1A and 1B through 4; hereinafter simply referred to as "the thin film magnetic head of the invention") in the case where the thin film magnetic head is mounted in the magnetic recording apparatus (refer to FIGS. 20 and 21) to perform recording were examined, the following results were obtained.

Figure 22:
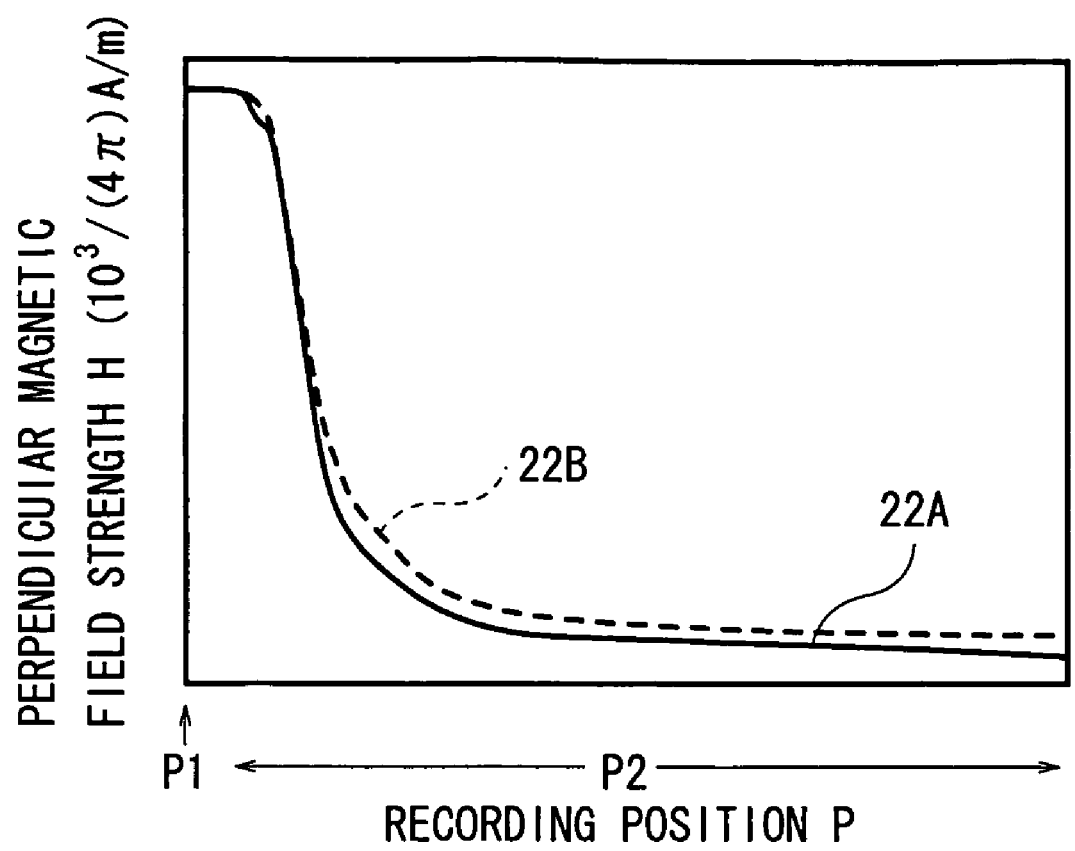
FIG. 22 is a plot showing a distribution of perpendicular magnetic field strength.

At first, when a correlation between the structure of the auxiliary magnetic pole layer and erasing of information recorded on the recording medium without intention was examined, the result shown in FIG. 22 was obtained. FIG. 22 shows a distribution of perpendicular magnetic field strength, and in FIG. 22, the horizontal axis indicates a recording position P, that is, a position on a track width direction when the position of the main magnetic pole layer is a reference, and the vertical axis indicates a perpendicular magnetic field strength H ($10^3/(4\pi)$A/m). When the correlation between the structure of the auxiliary magnetic pole layer and erasing of information recorded on the recording medium without intention in the thin film magnetic head of the invention was examined, the same correlation in the thin film magnetic head of the comparative example shown in FIG. 16 was examined so that the performance of the thin film magnetic head of the invention was evaluated in comparison. In FIG. 22, "22A (a solid line)" indicates the result of the thin film magnetic head of the invention (refer to FIG. 4), and "22B (a broken line)" indicates the result of the thin film magnetic head of the comparative example (refer to FIG. 16). As a structural condition of the thin film magnetic head of the invention, the depth of the auxiliary magnetic pole layer, that is, a difference between the thickness of the adjacent portion and the thickness of the nonadjacent portion which constituted the auxiliary magnetic pole layer was 0.1 μm.

It was obvious from the results shown in FIG. 22 that in both cases of the invention (22A) in which the auxiliary magnetic pole layer is formed so as to include the adjacent portion and the nonadjacent portion having different thicknesses and the comparative example (22B) in which the auxiliary magnetic pole layer is formed so as to have a uniform thickness as a whole, the perpendicular magnetic field strength H was distributed so as to reach the maximum (peak) in a recording position P (a recording position P1 corresponding to the position of the main magnetic pole layer) corresponding to a track to be recorded on the recording medium, and to be gradually reduced in a recording position P (a recording position P2 shifted from the position of the main magnetic pole layer in the track width direction) corresponding to an adjacent track. However, when the perpendicular magnetic field strengths H between the invention and the comparative example were compared, the perpendicular magnetic field strengths H were equivalent to each other in the recording position P1 corresponding to the track to be recorded, but the perpendicular magnetic field strength H in the invention was smaller than that in the comparative example in the recording position P2 corresponding to the adjacent track. Therefore, it was confirmed that in the thin film magnetic head of the invention, as the auxiliary magnetic pole layer was formed so as to include the adjacent portion and the nonadjacent portion having different thicknesses, the amount of the magnetic flux emitted from the auxiliary magnetic pole layer without intention in a recording region corresponding to the adjacent track (an unnecessary perpendicular magnetic field strength) was reduced, thereby information recorded on the recording medium was not easily erased without intention.

Figure 23:
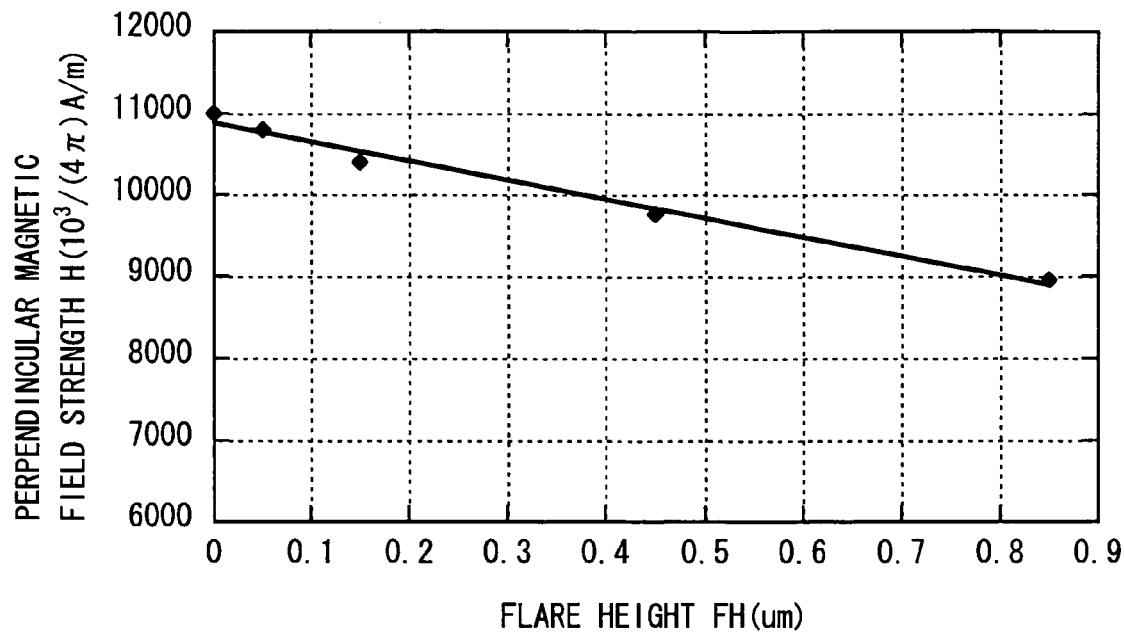
FIG. 23 is a plot showing dependence of perpendicular magnetic field strength on a flare height.
Figure 24:
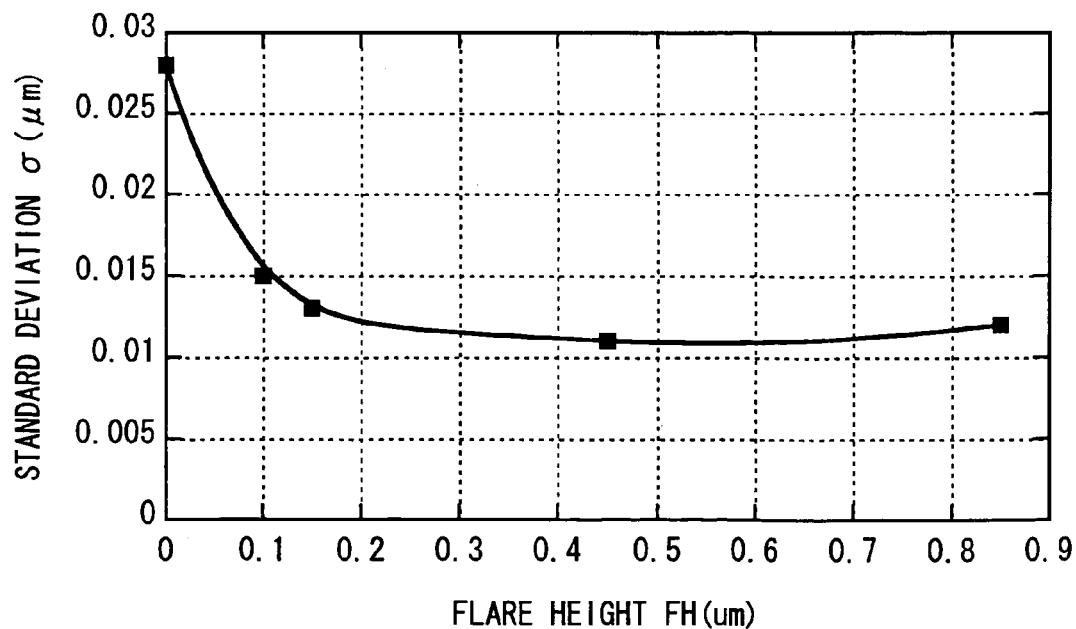
FIG. 24 is a plot showing dependence of the forming precision of a main magnetic pole layer on a flare height.

Next, when a correlation between the flare height and the recording characteristics or the processing characteristics of the main magnetic pole layer was examined, the results shown in FIGS. 23 and 24 were obtained. FIG. 23 shows dependence of perpendicular magnetic field strength on a flare height, and the horizontal axis indicates the flare height FH (μm) and the vertical axis indicates the perpendicular magnetic field strength H ($10^3/(4\pi)$A/m). FIG. 24 shows dependence of the forming precision of a main magnetic pole layer on a flare height, the horizontal axis indicates the flare height FH (μm) and the vertical axis indicates a standard deviation σ (μm) of the width of the front end portion in the main magnetic pole layer. As structural conditions of the thin film magnetic head of the invention, a target width of the front end portion in the main magnetic pole layer was 0.16 μm; the depth of the auxiliary magnetic pole layer was 0.1 μm; and the neck height NH was 0.15 μm.

It was obvious from the result shown in FIG. 23 that the perpendicular magnetic field strength H gradually decreased as the flare height FH increased. On the basis of the result shown in FIG. 23, it was found out that when the perpendicular magnetic field strength H larger than $9000 \times 10^3/(4\pi)$A/m (H>$9000 \times 10^3/(4\pi)$A/m) was required to stably perform recording through the use of the thin film magnetic head, the flare height FH which satisfied the condition was within a range of smaller than 0.8 μm (FH<0.8 μm). Moreover, it was obvious form the result shown in FIG. 24 that the standard deviation σ of the width of the front end portion was pronouncedly reduced as the flare height FH increased. On the basis of the result shown in FIG. 24, it was found out that when the standard deviation a smaller than 0.015 μm (σ<0.015 μm) was required as the forming precision of the front end portion to stably manufacture the thin film magnetic head, the flare height FH which satisfied the condition was within a range of larger than 0.1 μm (FH>0.1 μm).

Therefore, it was confirmed that when the flare height FH was within a range of larger than 0.1 μm and smaller than 0.8 μm (0.1 μm<FH<0.8 μm), the perpendicular magnetic field strength and the forming precision of the front end portion could be secured.

In particular, in the above description, on the basis of the results shown in FIGS. 23 and 24, the appropriate range of the flare height FH (0.1 μm<FH<0.8 μm) in the case where the neck height NH was 0.15 μm was specified. Further, when a relational expression was calculated on the basis of the correlation between the neck height NH and the flare height FH which were used to specify the above appropriate range, it was found out that a relationship of 0.4<FH(FH+NH)<0.84 between the neck height HN and the flare height FH was established. Therefore, it was confirmed that when the neck height NH and the flare height FH were set so as to establish the relational expression of 0.4<FH(FH+NH)<0.84, the perpendicular magnetic field strength and the forming precision of the front end portion could be secured while freely setting the neck height NH and the flare height FH.

Although the invention is described referring to the embodiment and the example, the invention is not limited to the embodiment and the example, and can be variously modified. More specifically, for example, in the above embodiment and the above example, the case where the invention is applied to a shield type head is described; however, it is not necessarily limited to this case, and the invention may be applied to a single-pole type head. Moreover, in the embodiment and the example, the case where the invention is applied to the composite thin film magnetic head is described; however, it is not necessarily limited to this case, and the invention can be applied to, for example, a thin film magnetic head for recording only comprising an inductive magnetic transducer for writing or a thin film magnetic head having an inductive magnetic transducer for recording/reproducing. In addition, the invention is applicable to a thin film magnetic head with a structure in which a device for writing and a device for reproducing are inversely laminated.

Moreover, in the embodiment and the example, the case where the invention is applied to the perpendicular recording system thin film magnetic head is described; however, it is not necessarily limited to this case, and the invention can be applied to a longitudinal recording system thin film magnetic head.

The thin film magnetic head, the method of manufacturing the thin film magnetic head and the magnetic recording apparatus according to the invention can be applied to, for example, a hard disk drive in which information is magnetically recorded on a hard disk.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head, comprising:
   a thin film coil generating a magnetic flux; and
   a magnetic pole layer extending from a recording-medium-facing surface facing a recording medium moving to a medium travel direction to the rear, emitting the magnetic flux generated in the thin film coil to the recording medium, and having a planar shape which includes a uniform width region determining the recording track width of the recording medium and having a uniform width and a widening region having a width larger than that of the uniform width region,
   wherein the magnetic pole layer has a laminate structure in which an auxiliary magnetic pole layer extending from a first widening position where the width of the magnetic pole layer expands from the uniform width region to the widening region to the rear, and determining a planar shape of the widening region, and a main magnetic pole layer extending from the recording-medium-facing surface to the rear on the medium travel direction of the auxiliary magnetic pole layer, including a first magnetic pole layer portion extending from the recording-medium-facing surface to the rear through the first widening position and a second magnetic pole layer portion having a width larger than that of the first magnetic pole layer portion in order from the recording-medium-facing surface, and determining a planar shape of the uniform width region are laminated in this order.

2. A thin film magnetic head according to claim 1, further comprising:
   an insulating layer disposed the auxiliary magnetic pole layer,
   wherein a flat surface includes an end surface of the auxiliary magnetic pole layer on the medium travel direction and an end surface of the insulating layer on the medium travel direction, and the main magnetic pole layer is disposed adjacent to the flat surface.

3. A thin film magnetic head according to claim 1, wherein a relationship of 0.40<FH/(FH+NH)<0.84 is established between a distance FH (μm) between the first widening position and a second widening position where the width of the main magnetic pole layer expands from the first magnetic pole layer portion to the second magnetic pole layer portion and a distance NH (μm) between the recording-medium-facing surface and the first widening position.

4. A thin film magnetic head according to claim 3, wherein the distance FH (μm) is within a range of larger than 0.1 μm and smaller than 0.8 μm.

5. A thin film magnetic head according to claim 1, wherein the auxiliary magnetic pole layer includes:
   a third magnetic pole layer portion being disposed adjacent to the main magnetic pole layer and having a first thickness; and
   a fourth magnetic pole layer portion being disposed nonadjacent to the main magnetic pole layer and having a second thickness smaller than the first thickness.

6. A thin film magnetic head according to claim 1, wherein the magnetic pole layer emits a magnetic flux for magnetizing the recording medium to a direction perpendicular to a surface thereof.

7. A method of manufacturing a thin film magnetic head, the thin film magnetic head comprising: a thin film coil generating a magnetic flux; and a magnetic pole layer extending from a recording-medium-facing surface facing a recording medium moving to a medium travel direction to the rear, emitting the magnetic flux generated in the thin film coil to the recording medium, and having a planar shape which includes a uniform width region determining the recording track width of the recording medium and having a uniform width and a widening region having a width larger than that of the uniform width region,
   wherein a step of forming the magnetic pole layer comprises:
   a first step of pattern-forming an auxiliary magnetic pole layer determining a planar shape of the widening region so as to extend from a first widening position where the width of the magnetic pole layer expands from the uniform width region to the widening region to the rear; and a second step of pattern-forming a main magnetic pole layer determining a planar shape of the uniform width region so as to extend from the recording-medium-facing surface to the rear on the medium travel direction of the auxiliary magnetic pole layer and include a first magnetic pole layer portion extending from the recording-medium-facing surface to the rear through the first widening position and a second magnetic pole layer portion having a width larger than that of the first magnetic pole layer portion in order from the recording-medium-facing surface, thereby forming the magnetic pole layer so as to have a laminate structure in which the auxiliary magnetic pole layer and the main magnetic pole layer are laminated in this order.

8. A method of manufacturing a thin film magnetic head according to claim 7, wherein in the second step, the main magnetic pole layer is formed through growing a plating film.

9. A method of manufacturing a thin film magnetic head according to claim 7, wherein in the second step, after a magnetic material layer is formed, the magnetic material layer is etched and patterned to form the main magnetic pole layer.

10. A method of manufacturing a thin film magnetic head according to claim 7, wherein a third step of forming an insulating layer so that the auxiliary magnetic pole layer and its surroundings are covered with the insulating layer; and a fourth step of forming a flat surface through polishing the auxiliary magnetic pole layer and the insulating layer so as to include an end surface of the auxiliary magnetic pole layer on the medium travel direction and an end surface of the insulating layer on the medium travel direction are included between the first step and the second step, and in the second step, the main magnetic pole layer is formed on the flat surface.

11. A method of manufacturing a thin film magnetic head according to claim 7, wherein a relationship of $0.40<FH/(FH+NH)<0.84$ is established between a distance FH ($\mu$m) between the first widening position and a second widening position where the width of the main magnetic pole layer expands from the first magnetic pole layer portion to the second magnetic pole layer portion and a distance NH ($\mu$m) between the recording-medium-facing surface and the first widening position.

12. A method of manufacturing a thin film magnetic head according to claim 11, wherein the distance FH ($\mu$m) is within a range of larger than 0.1 $\mu$m and smaller than 0.8 $\mu$m.

13. A method of manufacturing a thin film magnetic head according to claim 7, wherein in the first step, the auxiliary magnetic pole layer is formed so as to include a third magnetic pole layer portion being disposed adjacent to the main magnetic pole layer and having a first thickness and a fourth magnetic pole layer portion being disposed nonadjacent to the main magnetic pole layer and having a second thickness smaller than the first thickness.

14. A method of manufacturing a thin film magnetic head according to claim 13, wherein the first step includes:

a step of pattern-forming a precursor magnetic pole layer for forming the auxiliary magnetic pole layer so as to have the first thickness as a whole;

a step of forming the main magnetic pole layer on the precursor magnetic pole layer; and a step of forming the auxiliary magnetic pole layer through selectively etching and removing the precursor magnetic pole layer through the use of the main magnetic pole layer as a mask.

15. A method of manufacturing a thin film magnetic head according to claim 7, wherein the magnetic pole layer is formed so as to emit a magnetic flux for magnetizing the recording medium in a direction perpendicular to a surface thereof.

16. A magnetic recording apparatus, comprising:

a recording medium moving in a medium travel direction; and a thin film magnetic head performing magnetic processing on the recording medium, wherein the thin film magnetic head comprises:

a thin film coil generating a magnetic flux; and a magnetic pole layer extending from a recording-medium-facing surface facing a recording medium moving to a medium travel direction to the rear, emitting the magnetic flux generated in the thin film coil to the recording medium, and having a planar shape which includes a uniform width region determining the recording track width of the recording medium and having a uniform width and a widening region having a width larger than that of the uniform width region, and the magnetic pole layer has a laminate structure in which an auxiliary magnetic pole layer extending from a first widening position where the width of the magnetic pole layer expands from the uniform width region to the widening region to the rear, and determining a planar shape of the widening region, and a main magnetic pole layer extending from the recording-medium-facing surface to the rear on the medium travel direction of the auxiliary magnetic pole layer, including a first magnetic pole layer portion extending from the recording-medium-facing surface to the rear through the first widening position and a second magnetic pole layer portion having a width larger than that of the first magnetic pole layer portion in order from the recording-medium-facing surface, and determining a planar shape of the uniform width region are laminated in this order.

* * * * *